US010591278B2

(12) United States Patent
Kuga

(10) Patent No.: US 10,591,278 B2
(45) Date of Patent: *Mar. 17, 2020

(54) CONFOCAL DISPLACEMENT SENSOR

(71) Applicant: Keyence Corporation, Osaka (JP)

(72) Inventor: Shoma Kuga, Osaka (JP)

(73) Assignee: Keyence Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/296,264

(22) Filed: Mar. 8, 2019

(65) Prior Publication Data

US 2019/0204071 A1    Jul. 4, 2019

Related U.S. Application Data

(63) Continuation of application No. 15/989,216, filed on May 25, 2018, now Pat. No. 10,267,622, which is a
(Continued)

(30) Foreign Application Priority Data

Dec. 25, 2015 (JP) ................................ 2015-254807

(51) Int. Cl.
    *G01B 11/06* (2006.01)
    *G01B 11/00* (2006.01)
    (Continued)

(52) U.S. Cl.
    CPC .......... *G01B 11/0608* (2013.01); *G01B 11/00* (2013.01); *G01B 11/002* (2013.01);
    (Continued)

(58) Field of Classification Search
    CPC ............... G02B 21/06; G02B 21/0068; G02B 21/0032; G02B 21/006; G02B 21/0064;
    (Continued)

(56) References Cited

U.S. PATENT DOCUMENTS 3,788,741 A    1/1974 Buechler
4,585,349 A    4/1986 Gross et al.
(Continued)

FOREIGN PATENT DOCUMENTS

EP    2500685 A1    9/2012
JP    H11-132736 A    5/1999
(Continued)

OTHER PUBLICATIONS

International Search Report issued in corresponding International Patent Application No. PCT/JP2016/088009 dated Mar. 7, 2017 (4 pages).

*Primary Examiner* — Sang H Nguyen
(74) *Attorney, Agent, or Firm* — Kilyk & Bowersox, P.L.L.C.

(57) ABSTRACT

To provide a confocal displacement sensor capable of easily and accurately measuring displacement of a measurement object. Light having a chromatic aberration is converged by a lens unit 220 and irradiated on a measurement object S from a measurement head 200. Light having a wavelength reflected while focusing on the surface of the measurement object S passes through the optical fiber 314 in the measurement head 200. The light passed through the optical fiber 314 is guided to a spectral section 130 in a processing device 100 and spectrally dispersed. In the processing device 100, the light spectrally dispersed by the spectral section 130 is received by a light receiving section 140. A light reception signal output from the light receiving section 140 is acquired by a control section 152. The control section 152 measures displacement on the basis of the acquired light reception signal and gives the light reception signal to a PC 600 on the outside. A CPU 601 of the PC 600 causes a display section 700 to display, as change information, a change from a light reception signal acquired at a point in
(Continued)

time before a present point in time to a light reception signal acquired at the present point in time.

20 Claims, 26 Drawing Sheets

Related U.S. Application Data continuation of application No. PCT/JP2016/088009, filed on Dec. 21, 2016.

(51) Int. Cl.
  *G01D 5/34* (2006.01)
  *G01D 5/26* (2006.01)
(52) U.S. Cl.
  CPC .......... *G01D 5/34* (2013.01); *G01B 2210/50* (2013.01); *G01D 5/268* (2013.01)
(58) Field of Classification Search
  CPC ........... G01B 2210/50; G01B 11/0616; G01B 11/0608; G01B 7/105
  See application file for complete search history.

(56) References Cited

U.S. PATENT DOCUMENTS

| | | | |
|---|---|---|---|
| 5,737,084 A | 4/1998 | Ishihara | |
| 5,760,950 A | 6/1998 | Maly et al. | |
| 6,248,995 B1 | 6/2001 | Tanaami et al. | |
| 7,283,306 B2 | 10/2007 | Mikuriya et al. | |
| 7,616,986 B2 | 11/2009 | Seibel et al. | |
| 10,161,740 B1 | 12/2018 | Takei et al. | |
| 10,215,631 B2 | 2/2019 | Takei et al. | |
| 2004/0051879 A1 | 3/2004 | Schick | |
| 2012/0019821 A1 | 1/2012 | Chen et al. | |
| 2012/0318956 A1* | 12/2012 | Yamaguchi | G01N 15/1456 250/203.3 |
| 2013/0314705 A1* | 11/2013 | Tanabe | G01N 21/6458 356/338 |
| 2014/0055852 A1* | 2/2014 | Vizi | G02B 21/06 359/385 |
| 2014/0112562 A1* | 4/2014 | Yamakawa | A61B 3/102 382/131 |
| 2014/0236022 A1 | 8/2014 | Zeng et al. | |
| 2014/0336479 A1* | 11/2014 | Ando | A61B 5/4041 600/310 |
| 2015/0055215 A1 | 2/2015 | Chen et al. | |
| 2015/0185454 A1 | 7/2015 | Kalkbrenner et al. | |
| 2016/0246045 A1* | 8/2016 | Watanabe | G02B 21/0076 |
| 2018/0274902 A1 | 9/2018 | Kuga | |
| 2018/0274903 A1 | 9/2018 | Kuga | |
| 2018/0356207 A1 | 12/2018 | Takei et al. | |
| 2018/0356208 A1 | 12/2018 | Kuga et al. | |
| 2018/0356284 A1 | 12/2018 | Takei et al. | |

FOREIGN PATENT DOCUMENTS

| | | |
|---|---|---|
| JP | 2008-076119 A | 4/2008 |
| JP | 2009-198361 A | 9/2009 |
| JP | 2013-130581 A | 7/2013 |
| JP | 2015-169546 A | 9/2015 |

* cited by examiner

CONFOCAL DISPLACEMENT SENSOR

CROSS-REFERENCE TO RELATED APPLICATIONS

This application is a continuation of U.S. patent application Ser. No. 15/989,216, filed May 25, 2018, which is a continuation of PCT/JP2016/088009 filed Dec. 21, 2016. The present application claims foreign priority based on Japanese Patent Application No. 2015-254807, filed Dec. 25, 2015, the contents of which is incorporated herein by reference.

BACKGROUND OF THE INVENTION

1. Field of the Invention

The present invention relates to a confocal displacement sensor in which light in a wide wavelength band is used.

2. Description of Related Art

As a device that measures displacement of the surface of a measurement object in a noncontact manner, there is known a confocal displacement sensor. For example, JP-A-2013-130581 (Patent Literature 1) describes a chromatic point sensor (CPS) system that measures the distance from a predetermined reference position to a measurement object as displacement of the surface of the measurement object. The CPS described in Patent Literature 1 includes two confocal-system optical paths. Lights having a plurality of wavelengths are input to the optical paths. The light passed through either optical path is selectively output to the measurement object.

A first optical path is configured such that lights having different wavelengths are focused at different distances near a surface position of the measurement object in an optical axis direction. The light passed through the first optical path is reflected on the surface of the measurement object. In the reflected light, only light focused on the position of an opening section disposed in the first path as a spatial filter passes through the opening section to be guided to a wavelength detector. A spectrum profile (a first output spectrum profile) of the light detected by the wavelength detector includes a component indicating a measurement distance (distance-dependent profile component) and includes a distance-independent profile component.

A second optical path is configured such that lights having different wavelengths are focused at substantially the same distance near the surface position of the measurement object. The light passed through the second optical path is reflected on the surface of the measurement object. In the reflected light, only light focused on the position of an opening section disposed in a second path as a spatial filter passes through the opening section to be guided to a wavelength detector. A spectrum profile (a second output spectrum profile) of the light detected by the wavelength detector does not include a distance-dependent profile component and includes only a distance-independent profile component.

Correction for a potential measurement error related to the distance-independent profile component is performed concerning the first output spectrum profile using the second output spectrum profile.

In the CPS system described in Patent Literature 1, since the correction is performed concerning the first output spectrum profile, reliability is improved. Specifically, a measurement error due to, as the distance-independent profile component, a material component of the measurement object, a spectrum profile component of a light source associated with the light source, or a component associated with the wavelength detector is reduced.

Incidentally, it is sometimes difficult to perform accurate measurement depending on a relation between a traveling direction of the light output from the first optical path to the measurement object and the position and the posture of the measurement object. For example, when most of light output from the first optical path and reflected while focusing on the surface of the measurement object travels to a position deviating from the opening section of the first optical path, the light is likely to be not detected by the wavelength detector.

Therefore, the user needs to perform, before actually measuring displacement of the measurement object, relative positioning of the first optical path and the measurement object such that most of the light output from the first optical path and reflected while focusing on the surface of the measurement object passes through the opening section of the first optical path. However, the user cannot directly visually recognize the light reflected while focusing on the surface of the measurement object and the opening section of the first optical path. Therefore, such positioning requires skill. Accurate work of the positioning is difficult.

SUMMARY OF THE INVENTION

An object of the present invention is to provide a confocal displacement sensor capable of easily and accurately measuring displacement of a measurement object.

(1) A confocal displacement sensor according to the present invention is a confocal displacement sensor including: a light projecting section configured to emit light having a plurality of wavelengths; an optical member configured to cause a chromatic aberration along an optical axis direction in the light emitted by the light projecting section, converge the light having the chromatic aberration, and irradiate the light on a measurement object; a pinhole member including a pinhole that allows, in the light irradiated on the measurement object by the optical member, light having a wavelength reflected while focusing on a surface of the measurement object to pass; an acquiring section configured to acquire a light reception signal indicating intensity for each wavelength concerning the light reflected on the surface of the measurement object and passing through the pinhole; a displacement measuring section configured to calculate displacement of the measurement object on the basis of signal intensity for each wavelength of the light passed through the pinhole; and a display section configured to display, as change information, a change from a light reception signal acquired by the acquiring section at a point in time before a present point in time to a light reception signal acquired by the acquiring section at the present point in time.

In the confocal displacement sensor, the light having the plurality of wavelengths is emitted from the light projecting section. The chromatic aberration along the optical axis direction is caused by the optical member in the light emitted from the light projecting section. The light having the chromatic aberration is converged and irradiated on the measurement object by the optical member.

In the light irradiated on the measurement object by the optical member, the light having the wavelength reflected while focusing on the surface of the measurement object passes through the pinhole of the pinhole member. The light reception signal indicating the intensity for each wavelength is acquired concerning the light reflected on the surface of the measurement object and passed through the pinhole. The displacement of the measurement object is calculated on the basis of the signal intensity for each wavelength of the light passed through the pinhole.

When a relation between relative positions and relative postures of the optical member, the pinhole, and the measurement object changes, in the light irradiated on the measurement object by the optical member, the intensity of the light reflected on the surface of the measurement object and passing through the pinhole also changes. When most of the light reflected from the measurement object passes through the pinhole, the intensity of the light passing through the pinhole increases. Therefore, a value of the light reception signal acquired by the acquiring section increases. On the other hand, when most of the light reflected from the measurement object travels to a position deviating from the pinhole, the intensity of the light passing through the pinhole decreases. Therefore, the value of the light reception signal acquired by the acquiring section decreases. In order to accurately calculate displacement of the measurement object without being affected by noise and the like, it is desirable that the relation between the relative positions and the relative postures of the optical member, the pinhole, and the measurement object is adjusted such that the value of the light reception signal becomes higher.

With the configuration explained above, information indicating the change of the light reception signal acquired by the acquiring section at the point in time before the present point in time to the light reception signal acquired by the acquiring section at the present point in time is displayed as the change information by the display section. Consequently, a user can adjust a relative positional relation and a relative postural relation between the optical member, the pinhole, and the measurement object according to the change of the light reception signal by visually recognizing the change information displayed on the display section. As a result, it is possible to easily and accurately measure the displacement of the measurement object.

(2) The change information may include a change from a peak value of one or a plurality of light reception signals acquired by the acquiring section at one or a plurality of points in time before the present point in time to a peak value of the light reception signal acquired by the acquiring section at the present point in time.

The displacement of the measurement object can be calculated on the basis of a peak value of the light reception signal acquired by the acquiring section. With the configuration explained above, information indicating the change from the peak value of the one or plurality of light reception signals acquired by the acquiring section at the one or plurality of points in time before the present point in time to the peak value of the light reception signal acquired by the acquiring section at the present point in time is displayed as the change information by the display section. Therefore, the user can adjust the positional relation and the postural relation such that the peak value of the light reception signal further increase.

(3) The change information may include a change from a waveform of the light reception signal acquired by the acquiring section at the point in time before the present point in time to a waveform of the light reception signal acquired by the acquiring section at the present point in time.

In this case, the user can confirm a change of the waveform of the light reception signal by visually recognizing the change information. A waveform of a peak of the light reception signal corresponds to the distance between the optical member and the measurement object. Therefore, the user can recognize changes of a relative positional relation and a relative postural relation between the optical member and the measurement object on the basis of the position of the peak of the light reception signal. As a result, it is possible to more easily perform adjustment of the relative positional relation and the relative postural relation among the optical member, the pinhole, and the measurement object.

(4) The confocal displacement sensor may further include a processing section configured to be operable in a measurement mode for measuring displacement of the measurement object and a confirmation mode for causing the display section to display the change information. The processing section may calculate the displacement of the measurement object on the basis of intensity for each wavelength acquired by the acquiring section in the measurement mode.

In this case, the user can measure the displacement of the measurement object in the measurement mode after performing adjustment of a relative positional relation and a relative postural relation among the optical member, the pinhole, and the measurement object in the confirmation mode.

(5) The processing section may determine whether a peak value of the light reception signal acquired by the acquiring section at the present point in time satisfies a predetermined condition and cause the display section to display a result of the determination together with the change information.

In this case, the user can easily confirm whether the relative positional relation and the relative postural relation among the optical member, the pinhole, and the measurement object satisfy a fixed condition.

(6) The confocal displacement sensor may further include a wavelength-range designating section configured to designate a range of a wavelength concerning the light reception signal acquired by the acquiring section. The processing section may cause the display section to display, as the change information, a change from a peak value of the light reception signal acquired by the acquiring section at the point in time before the present point in time to a peak value of the light reception signal acquired by the acquiring section at the present point in time within a range of the wavelength designated by the wavelength-range designating section.

In this case, the user can confirm, over time, a change of a peak value of a light reception signal within a desired wavelength range. Therefore, convenience of adjustment of the relative positional relation and the relative postural relation among the optical member, the pinhole, and the measurement object is improved.

(7) The processing section may perform, before calculating the displacement of the measurement object, correction processing to remove, from the light reception signal acquired by the acquiring section, at least a part of unnecessary components corresponding to unnecessary light excluding the light reflected while focusing on the surface of the measurement object.

In this case, since at least a part of unnecessary components of light is removed from the light reception signal by the processing section before calculating the displacement of the measurement object, it is possible to cause the display section to more accurately display the peak value of the light reception signal.

(8) The confocal displacement sensor may further include a processing device and a head section. The processing device may include the light projecting section and the acquiring section and further include a first housing configured to house the light projecting section and the acquiring section.

The head section may include the optical member and the pinhole member and further include a second housing configured to house the optical member and the pinhole member.

In this case, the processing device including the light projecting section and the acquiring section and the head section including the optical member and the pinhole member are separately provided. Therefore, it is easy to use the head section including the optical member that causes an appropriate chromatic aberration according to the shape, the disposition, or the like of the measurement object or the optical member having an appropriate focal length.

Further, in the head section, the optical member and the pinhole member are housed in the second housing. Consequently, it is possible to fix a relative positional relation and a relative postural relation between the optical member and the pinhole member in advance in the second housing. In this case, it is unnecessary to individually adjust the relative positional relation and the relative postural relation among the optical member, the pinhole, and the measurement object. As a result, it is possible to more easily measure the displacement of the measurement object.

(9) The confocal displacement sensor may include a plurality of the head sections. The acquiring section may be configured to be capable of acquiring a light reception signal indicating intensity for each wavelength concerning light emitted from an optical member of one head section among the plurality of head sections and passing through a pinhole of another head section.

In this case, it is possible to display, on the display section, change information concerning the light reception signal of the light passing through the pinhole of the other head section from the one head section among the plurality of head sections. Consequently, the user can easily match the optical axis of the one head section and the optical axis of the other head section in a state in which the one head section and the other head section are disposed such that optical members are opposed to each other. In this state, it is possible to accurately measure the thickness of the measurement object by disposing the measurement object between the one head section and the other head section.

According to the present invention, it is possible to easily and accurately measure the displacement of the measurement object.

DESCRIPTION OF EMBODIMENTS

Confocal displacement sensor according to embodiments of the present invention are explained below with reference to the drawings.

[1] First Embodiment (1) Basic Configuration of a Confocal Displacement Sensor

Figure 1:
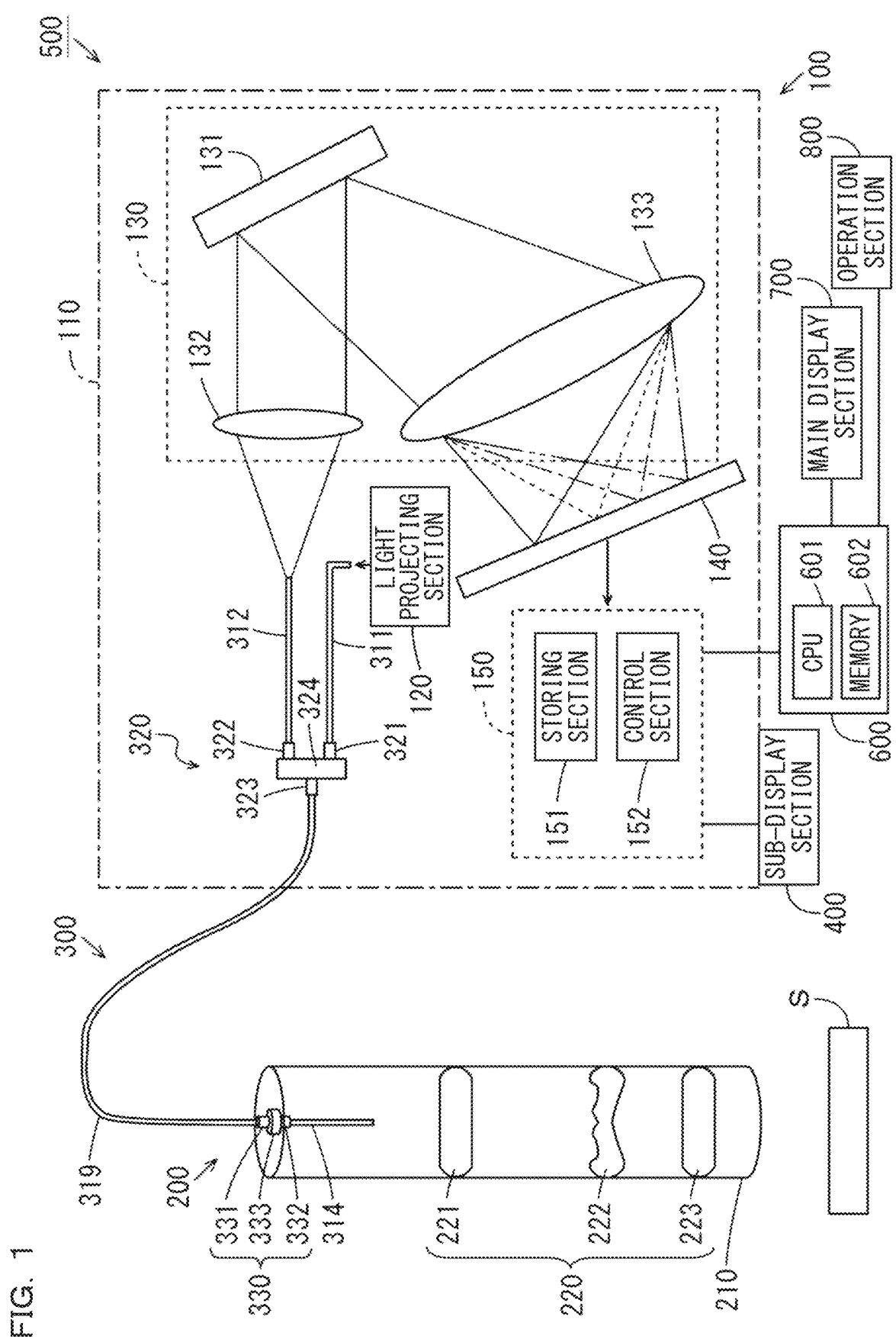
FIG. 1 is a schematic diagram showing the configuration of a confocal displacement sensor according to a first embodiment.

FIG. 1 is a schematic diagram showing the configuration of a confocal displacement sensor according to a first embodiment. As shown in FIG. 1, a confocal displacement sensor 500 includes a processing device 100, a measurement head 200, a light guide section 300, a PC (personal computer) 600, a main display section 700, and an operation section 800. The light guide section 300 includes a plurality of optical fibers and optically connects the processing device 100 and the measurement head 200.

The processing device 100 includes a housing 110, a light projecting section 120, a spectral section 130, a light receiving section 140, an arithmetic processing section 150, and a sub-display section 400. The housing 110 houses the light projecting section 120, the spectral section 130, the light receiving section 140, and the arithmetic processing section 150. The sub-display section 400 includes a display device such as a seven-segment display device or a dot-matrix display device and is attached to the housing 110. The light projecting section 120 is configured to be capable of emitting light in a wide wavelength band (e.g., 500 nm to 700 nm), that is, light having a plurality of wavelengths. A detailed configuration of the light projecting section 120 is explained below. Light emitted by the light projecting section 120 is input to an optical fiber 311 of the light guide section 300 explained below.

The spectral section 130 includes a diffraction grating 131 and a plurality of (in this example, two) lenses 132 and 133. As explained bellow, a part of light emitted by the light projecting section 120 and reflected on the surface of a measurement object S is output from an optical fiber 312 of the light guide section 300. The light output from the optical fiber 312 passes through the lens 132 to thereby be substantially collimated and made incident on the diffraction grating 131. In this embodiment, the diffraction grating 131 is a reflection-type diffraction grating. The light made incident on the diffraction grating 131 is spectrally dispersed to be reflected at a different angle for each wavelength and passes through the lens 133 to thereby be focused on a position on one dimension different for each wavelength.

The light receiving element 140 includes an imaging element (a one-dimensional line sensor) on which a plurality of pixels are one-dimensionally arrayed. The imaging element may be a multi-division PD (photodiode), a CCD (charge coupled device) camera, or a CMOS (complementary metal oxide semiconductor) image sensor or may be other elements. The light receiving section 140 is disposed such that the plurality of pixels of the imaging element respectively receive lights in a plurality of focus positions different for each wavelength formed by the lens 133 of the spectral section 130. Analog electric signals (hereinafter referred to as light reception signals) corresponding to light reception amounts are output from the pixels of the light receiving section 140. The light reception signal indicates intensity of the light received by each pixel.

The arithmetic processing section 150 includes a storing section 151 and a control section 152. The storing section 151 includes, for example, a ROM (read only memory), a RAM (random access memory), or a hard disk. In the storing section 151, a control program for controlling components in the processing device 100 and a calculation program for calculating displacement are stored and various data used for displacement measurement are stored. The control section 152 includes, for example, a CPU (central processing unit).

The control section 152 acquires a light reception signal output by the light receiving section 140, measures displacement of a measurement object S on the basis of the calculation program and the data stored in the storing section 151, and displays a result of the measurement on the sub-display section 400.

The PC 600 is connected to the arithmetic processing section 150. The PC 600 includes a CPU (central processing unit) 601 and a memory 602. In the memory 602, a displacement measuring program is stored and various data used for displacement measurement are stored.

The control section 152 of the processing device 100 further gives a light reception signal acquired from the light receiving section 140 to the CPU 601 of the PC 600. The CPU 601 acquires the light reception signal given from the control section 152 and executes displacement measurement processing for the measurement object S on the basis of the displacement measuring program and the data stored in the memory 602. The CPU 601 is configured to be operable in a measurement mode and a confirmation mode. The displacement measurement processing includes light reception confirmation processing explained below.

During the execution of the displacement measurement processing, the CPU 601 calculates displacement of the measurement object S in the measurement mode. On the other hand, the CPU 601 acquires a light reception signal from the control section 152 in the confirmation mode and executes light reception confirmation processing on the basis of the data stored in the memory 602. The light reception confirmation processing is processing for generating, as change information, a change from a light reception signal acquired at a point in time before the present point in time to a light reception signal acquired at the present point in time and causing the main display section 700 to display the generated change information. In this embodiment, a change from a peak value of the light reception signal acquired at the point in time before the present point in time to a peak value of the light reception signal acquired at the present point in time is generated as change information.

The measurement head 200 includes a housing 210 having a substantially axially symmetrical shape (e.g., a cylindrical shape), the optical fiber 314, and a lens unit 220. The housing 210 houses the optical fiber 314 and the lens unit 220.

A fiber connector 330 of the light guide section 300 explained below is attached to one end of the housing 210. The optical fiber 314 is connected to the fiber connector 330 in the housing 210. Light is guided from the processing device 100 to the optical fiber 314 through the light guide section 300. The light guided to the optical fiber 314 is output from the optical fiber 314 in the housing 210 and guided to the lens unit 220.

The lens unit 220 includes a refraction lens 221, a diffraction lens 222, and an objective lens 223. The light guided to the lens unit 220 passes through the refraction lens 221 and the diffraction lens 222 in order. Consequently, a chromatic aberration occurs in the light along the optical axis direction. The light in which the chromatic aberration occurs is guided to the outside of the housing 210 through the objective lens 223 and irradiated on the measurement object S. The objective lens 223 is disposed such that the light in which the chromatic aberration occurs is capable of focusing on a position near the surface of the measurement object S.

The light guide section 300 includes a plurality of (in this example, three) optical fibers 311, 312, and 319, a fiber coupler 320, and the fiber connector 330. In the example shown in FIG. 1, the fiber coupler 320 is provided in the housing 110 of the processing device 100. The fiber connector 330 is attached to the housing 210 of the measurement head 200.

The fiber coupler 320 has a so-called 1×2-type configuration. The fiber coupler 320 includes three ports 321 to 323 and a main body section 324. The ports 321 and 322 and the port 323 are connected to the main body section 324 to be opposed to each other across the main body section 324. Light input to at least one of the ports 321 and 322 is output from the port 323. Light input to the port 323 is output from each of the ports 321 and 322.

The fiber connector 330 includes two ports 331 and 332 and a main body section 333. The port 331 and the port 332 are connected to the main body section 333 to be opposed to each other across the main body section 333. Light input to the port 331 is output from the port 332. Light input to the port 332 is output from the port 331.

The optical fibers 311 and 312 are respectively connected to the ports 321 and 322 of the fiber coupler 320. The optical fiber 314 is connected to the port 332 of the fiber connector 330. The port 323 of the fiber coupler 320 and the port 331 of the fiber connector 330 are connected by the optical fiber 319.

With this configuration, light emitted by the light projecting section 120 of the processing device 100 is input to the port 321 of the fiber coupler 320 through the optical fiber 311. The light input to the port 321 is output from the port 323 and input to the port 331 of the fiber connector 330 through the optical fiber 319. The light input to the port 331 is output from the port 332 and irradiated on the measurement object S through the optical fiber 314 and the lens unit 220.

A part of the light reflected on the surface of the measurement object S is input to the port 332 of the fiber connector 330 through the lens unit 220 and the optical fiber 314. The light input to the port 332 is output from the port 331 and input to the port 323 of the fiber coupler 320 through the optical fiber 319. The light input to the port 323 is output from the ports 321 and 322. The light output from the port 322 is guided to the spectral section 130 through the optical fiber 312. Consequently, the displacement measurement processing is performed.

The main display section 700 includes a display device such as an organic EL (electroluminescence) panel or a liquid crystal display panel. The main display section 700 is connected to the PC 600. On the main display section 700, a numerical value such as a measurement distance calculated by the displacement measurement processing in a state in which the CPU 601 is in the measurement mode, a waveform of a light reception signal given to the CPU 601 from the control section 152, and the like are displayed. On the main display section 700, the change information is displayed in a state in which the CPU 601 is in the confirmation mode.

The operation section 800 includes a keyboard and a pointing device. The pointing device includes a mouse or a joystick. The operation section 800 is connected to the PC 600. The user can perform switching of, for example, the measurement mode and the confirmation mode by operating the operation section 800.

The PC 600 is configured to be further connectable to a not-shown external device such as a programmable controller. The PC 600 is capable of transmitting a result of the displacement measurement processing and the change information to the external device.

A reference range for pass/fail determination with respect to a measurement distance of the measurement object S may be set in the PC 600. In this case, when the measurement distance is within the reference range, a determination result (e.g., "OK") indicating that the measurement object S is a non-defective product is displayed on the main display section 700. On the other hand, when the measurement distance is outside the reference range, a determination result (e.g., "NG") indicating that the measurement object S is a defective product is displayed on the main display section 700.

(2) Operation Principle of the Confocal Displacement Sensor

Figure 2:
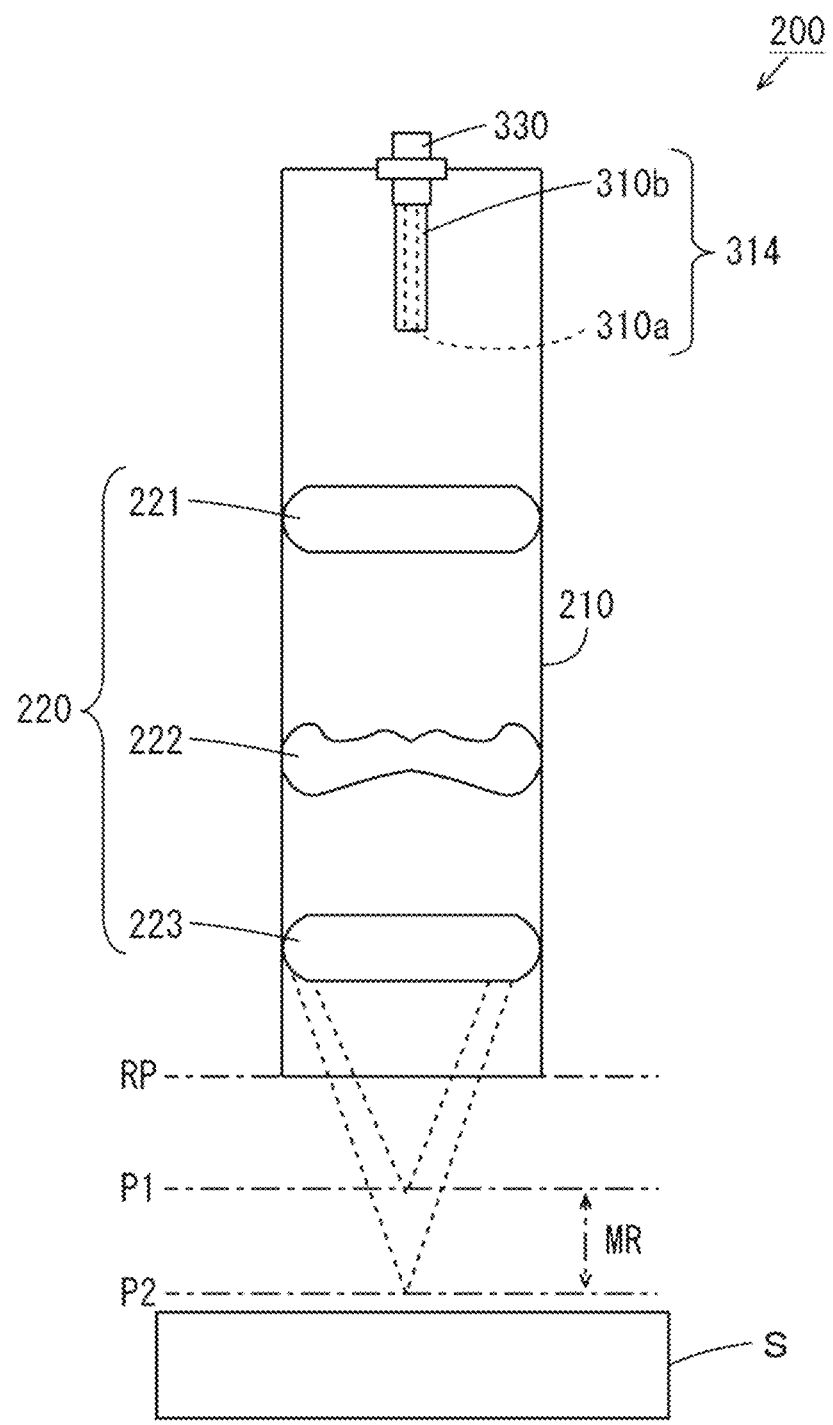
FIG. 2 is a diagram for explaining an operation principle of the confocal displacement sensor including a measurement head.

FIG. 2 is a diagram for explaining an operation principle of the confocal displacement sensor 500 including the measurement head 200. As shown in FIG. 2, the optical fiber 314 includes a core 310a and a clad 310b. The core 310a (an optical axis) is disposed to be located on the optical axis of the lens unit 220. The core 310a is covered by the clad 310b. Light input to one end portion of the core 310a is output from the other end portion of the core 310a. Note that the optical fibers 311, 312, and 319 shown in FIG. 1 have the same configuration as the configuration of the optical fiber 314. The diameter of the core 310a is desirably 200 μm or less and more desirably 50 μm or less.

Light output from the optical fiber 314 passes through the refraction lens 221 and the diffraction lens 222. Consequently, a chromatic aberration occurs in the light. The light in which the chromatic aberration occurs passes through the objective lens 223 to thereby focus on a position different for each wavelength. For example, light having a short wavelength focuses on a position close to the objective lens 223. Light having a long wavelength focuses on a position far from the objective lens 223. A range between a focus position P1 closest to the objective lens 223 and a focus position P2 farthest from the objective lens 223 is a measurement range MR. In this example, the refraction lens 221 has a convex shape and the diffraction lens 222 has a concave shape. In this case, the chromatic aberration that occurs in the light increases. Consequently, it is possible to increase the measurement range MR.

When the surface of the measurement object S is present in the measurement range MR, the light passed through the objective lens 223 is irradiated on the surface of the measurement object S and thereafter reflected to a wide range by the surface. In this embodiment, a distal end portion of the optical fiber 314 functions as a spatial filter including very small pinholes. Therefore, most of the light reflected on the surface of the measurement object S is not input to the optical fiber 314.

On the other hand, light having a specific wavelength focused on the position of the surface of the measurement object S is reflected on the surface to thereby pass through the lens unit 220 to be input to the distal end portion of the core 310a of the optical fiber 314. The wavelength of the light input to the optical fiber 314 indicates a measurement distance. The measurement distance is the distance from a predetermined reference position RP to the position of the surface of the measurement object S. Note that, in this example, the reference position RP is the position of the distal end portion of the housing 210 closest to the measurement object S.

The light input to the optical fiber 314 is guided to the processing device 100 shown in FIG. 1 and spectrally dispersed by the diffraction grating 131 and focused on a position different for each wavelength by the lens 133. The plurality of pixels of the light receiving section 140 are respectively disposed in focus positions of a plurality of lights different for each wavelength. Therefore, the pixels of the light receiving section 140 receive lights having wavelengths associated with the pixels and output light reception signals.

With this configuration, it is possible to specify the wavelengths of the received lights by specifying the positions of the pixels of the light receiving section 140 that output the light reception signals indicating peak values. It is possible to specify a measurement distance by specifying the wavelengths of the received lights. That is, with the configuration explained above, it is possible to specify the measurement distance on the basis of the peak values of the light reception signals.

When the position and the posture of the measurement head 200 with respect to the measurement object S change, in the light irradiated on the measurement object S, a light amount of light reflected while focusing on the surface of the measurement object S and input to the optical fiber 314 also changes. Therefore, the intensity of the light received by the light receiving section 140 also changes. In this embodiment, the posture of the measurement head 200 means the direction of the optical axis of the measurement head 200.

Figure 3:
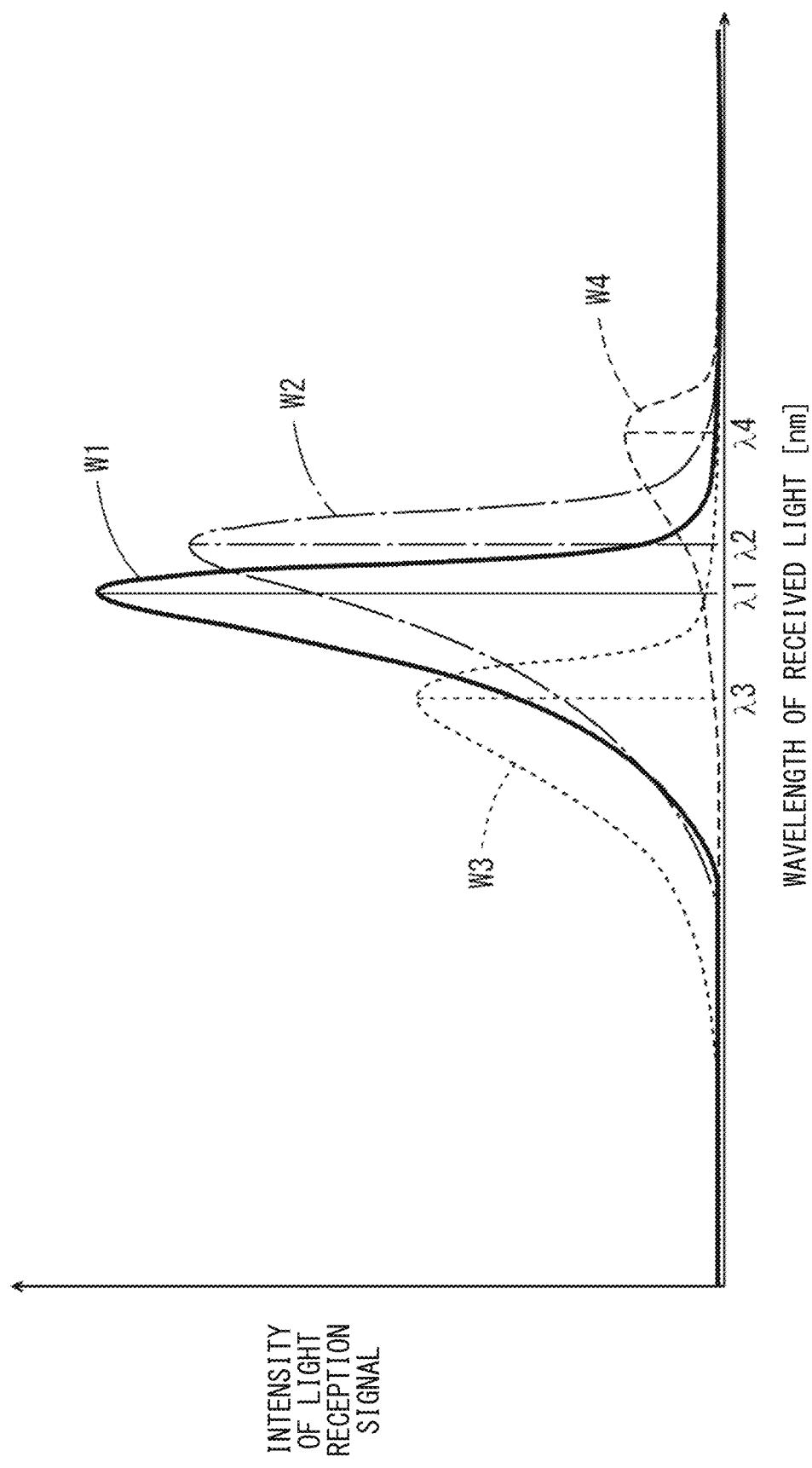
FIG. 3 is a diagram showing a relation between the wavelength of light received by a light receiving section and the intensity of a light reception signal.

FIG. 3 is a diagram showing a relation between the wavelength of light received by the light receiving section 140 and the intensity of a light reception signal. The horizontal axis of FIG. 3 indicates the wavelength of the received light and the vertical axis indicates the intensity of the light reception signal. The same applies to FIGS. 6 to 8 and FIG. 10 referred to below. The horizontal axis of FIG. 3 and FIGS. 6 to 8 and FIG. 10 referred to below is equivalent to the positions of the pixels of the light receiving section 140.

In FIG. 3, waveforms of light reception signals (hereinafter referred to as light reception waveforms) W1 to W4 of lights input to the optical fiber 314 when lights are irradiated from the measurement head 200 on the measurement object S in four states in which positions and postures are different from one another are respectively indicated by a thick solid line, an alternate long and short dash line, a dotted line, and a broken line. Wavelengths of peaks (hereinafter referred to as peak wavelengths) of the light reception waveforms W1 to W4 are respectively $\lambda 1$ to $\lambda 4$. Peak values of a plurality of light reception waveforms W1 to W4 are different from one another according to the position and the posture of the measurement head 200 with respect to the measurement object S.

For example, when most of the light reflected while focusing on the surface of the measurement object S is input to the core 310a, as indicated by the light reception waveforms W1 and W2 shown in FIG. 3, the peak values of the light reception signals increase. On the other hand, when most of the light reflected while focusing on the surface of the measurement object S travels to a position deviating from the core 310a, as indicated by the light reception waveforms W3 and W4 in FIG. 3, the peak values of the light reception signals decrease. When the peak values of the light reception signals are low, it is likely that peaks cannot be identified from the light reception signals because of the influence of noise and the like. Therefore, it is difficult to accurately calculate displacement of the measurement object S.

Therefore, the user needs to adjust the position and the posture of the measurement head 200 with respect to the measurement object S such that the peak values of the light reception signals output from the light receiving section 140 increase.

Therefore, in the confocal displacement sensor 500 according to this embodiment, the CPU 601 operates in the confirmation mode, whereby the change information is generated. The generated change information is displayed on the main display section 700. In this embodiment, the light reception signal acquired at the present point in time means the latest light reception signal acquired by the CPU 601.

In this case, by visually recognizing the change information displayed on the main display section 700, the user can appropriately adjust the position and the posture of the measurement head 200 with respect to the measurement object S such that higher peak values can be obtained while recognizing a change over time of the peak values of the light reception signals. As a result, the user is capable of easily and accurately measuring the displacement of the measurement object S.

(3) Light Projecting Section

Figure 4A:
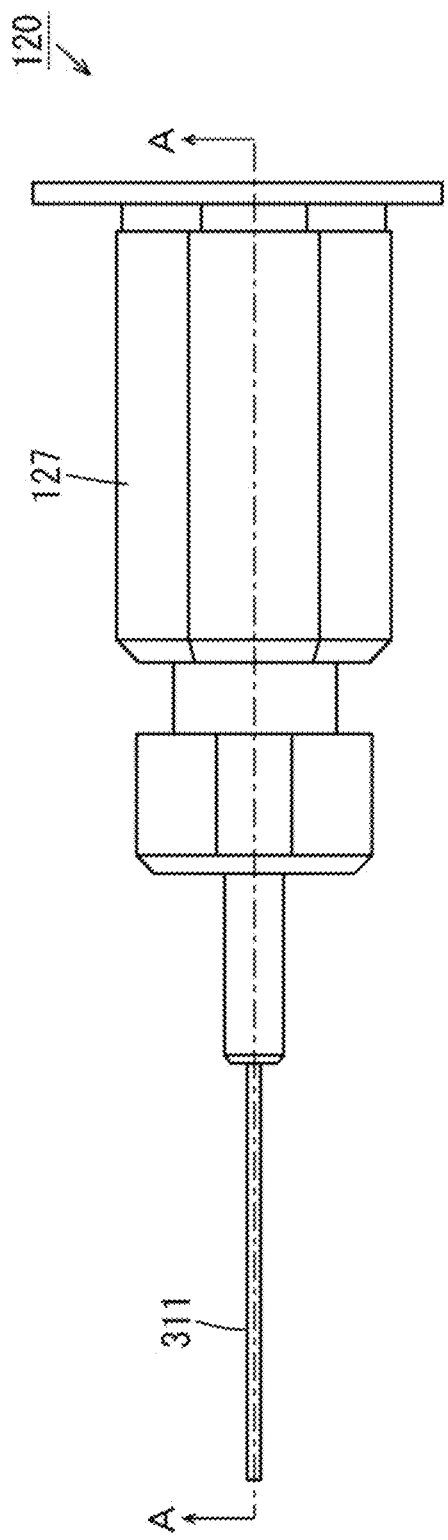
FIGS. 4A and 4B are a plan view and a sectional view showing the configuration of a light projecting section.
Figure 4B:
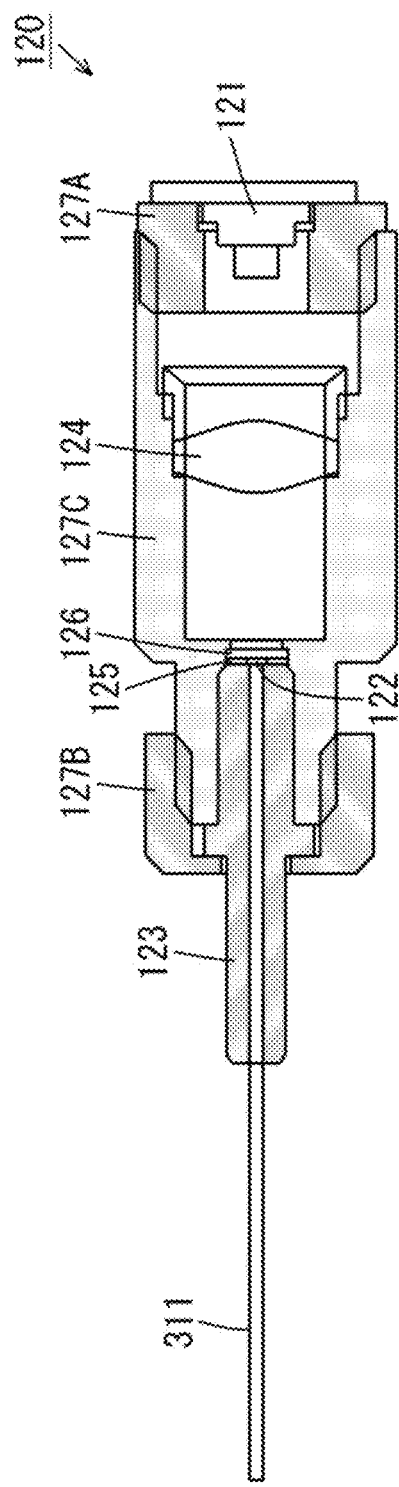

FIGS. 4A and 4B are respectively a plan view and a sectional view showing the configuration of the light projecting section 120. As shown in FIGS. 4A and 4B, the light projecting section 120 includes a light source 121, a phosphor 122, a ferrule 123, a lens 124, a holder 125, a filter element 126, and an element holder 127. The element holder 127 includes a light-source fixing section 127A, a ferrule fixing section 127B, and a lens fixing section 127C. The light source 121, the ferrule 123, and the lens 124 are respectively fixed to the light-source fixing section 127A, the ferrule fixing section 127B, and the lens fixing section 127C of the element holder 127.

The light source 121 is a laser diode that emits light having a single wavelength. In this embodiment, the light source 121 emits light in a blue region or an ultraviolet region having a wavelength of 450 nm or less. The phosphor 122 absorbs excitation light in the blue region or the ultraviolet region and discharges fluorescent light in a wavelength region different from the wavelength region of the excitation light.

The fluorescent light discharged from the phosphor 122 in this example has a wavelength in a wide range compared with the excitation light. That is, the fluorescent light discharged from the phosphor 122 has a plurality of wavelengths. Note that the phosphor 122 may discharge fluorescent light in a yellow region, may discharge fluorescent light in a green region, or may discharge fluorescent light in a red region. The phosphor 122 may be configured by a plurality of fluorescent members.

The ferrule 123 holds the end portion of the optical fiber 311 of the light guide section 300 shown in FIG. 1. The lens 124 is disposed between the light source 121 and the ferrule 123. One end face of the holder 125 having an annular shape is attached to the end portion of the ferrule 123 (the optical fiber 311). The phosphor 122 is housed in the inner circumferential portion of the holder 125. The filter element 126 is attached to the other end face of the holder 125 to cover the phosphor 122 in the holder 125. The filter element 126 is a reflection-type filter. The filter element 126 reflects light in the yellow region, the green region, or the red region and transmits light in the blue region or the ultraviolet region.

With this configuration, light emitted by the light source 121 passes through the lens 124 to thereby be condensed on the phosphor 122 as excitation light. The phosphor 122 absorbs the excitation light and discharges fluorescent light. The excitation light transmitted through the phosphor 122 without being absorbed by the phosphor 122 and the fluorescent light discharged from the phosphor 122 are mixed, whereby light in a wide wavelength band is generated. In this example, in order to generate light obtained by mixing the excitation light and the fluorescent light at a desired ratio, the thickness of the phosphor 122 in the optical path direction is set to, for example, 10 μm to 200 μm. The concentration of the phosphor 122 in the holder 125 is set to, for example, 30% to 60%.

Light generated in the light projecting section 120 passes through the ferrule 123 to thereby be input to the optical fiber 311. Fluorescent light discharged to a direction opposite to the optical fiber 311 by the phosphor 122 is reflected to the direction of the optical fiber 311 by the filter element 126. Consequently, it is possible to efficiently input the fluorescent light to the optical fiber 311.

In this example, the phosphor 122 is housed in the holder 125. However, the present invention is not limited to this. The phosphor 122 may be applied to the end face of the ferrule 123. In this case, the light projecting section 120 does not include the holder 125. The light projecting section 120 includes the filter element 126. However, the present invention is not limited to this. When sufficient fluorescent light is input to the optical fiber 311, the light projecting section 120 may not include the filter element 126.

(4) Arithmetic Processing Section

In the storing section 151 of the arithmetic processing section 150 shown in FIG. 1, a conversion formula for the positions of the pixels of the light receiving section 140, a peak wavelength of an output light reception waveform, and a measurement distance is stored in advance together with the calculation program explained above. The control section 152 of the arithmetic processing section 150 specifies the positions of the pixels, which output light reception signals, and sequentially calculates a peak wavelength of a light reception waveform and a measurement distance on the basis of the specified positions of the pixels and the conversion formula stored in the storing section 151 and displays the calculated measurement distance on the sub-display section 400. Consequently, it is possible to measure thickness, a distance, or displacement of the measurement object S. The control section 152 performs unnecessary component removal correction, light reception waveform shift correction, and light reception waveform scale correction explained below in order to more accurately calculate the measurement distance.

(a) Unnecessary Component Removal Correction

Light different from the light reflected while focusing on the surface of the measurement object S is sometimes received by the light receiving section 140. In the following explanation, in the light received by the light receiving section 140, light excluding the light reflected while focusing on the surface of the measurement object S is referred to as unnecessary light.

Figure 5:
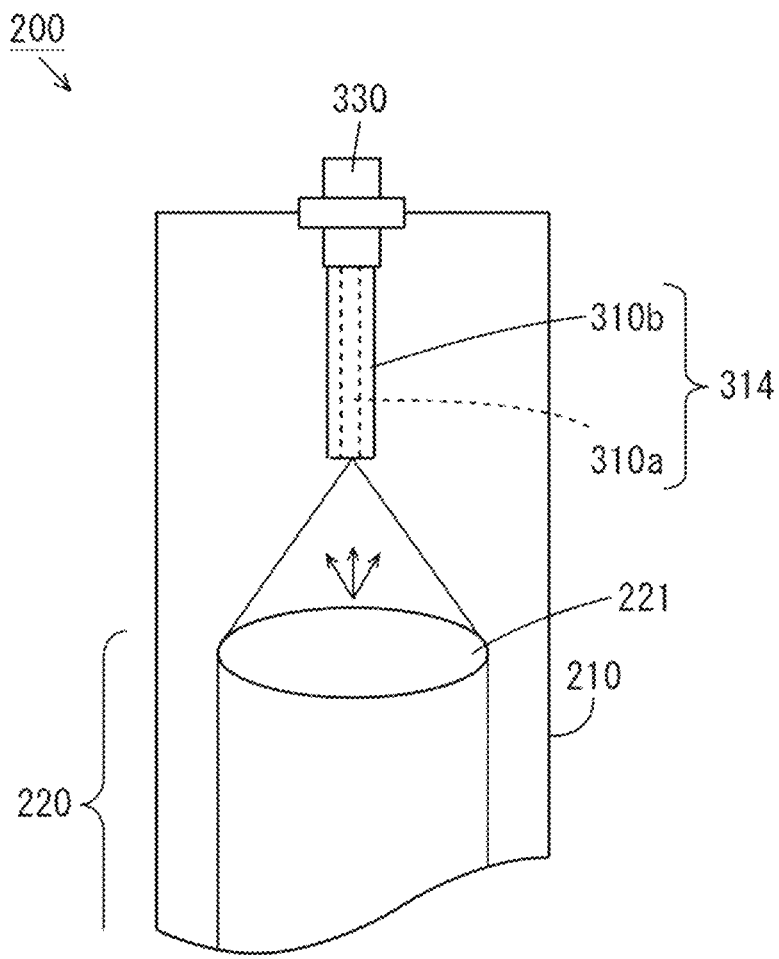
FIG. 5 is a schematic diagram showing an example of unnecessary light reflected in a portion different from a measurement object.

FIG. 5 is a schematic diagram showing an example of unnecessary light reflected on a portion different from the measurement object S. In the example shown in FIG. 5, light (light indicated by an arrow) directly reflected by the refraction lens 221 of the lens unit 220 is input to the optical fiber 314. A light reception waveform corresponding to such light does not include a component indicating a measurement distance and includes an unnecessary component.

Figure 6:
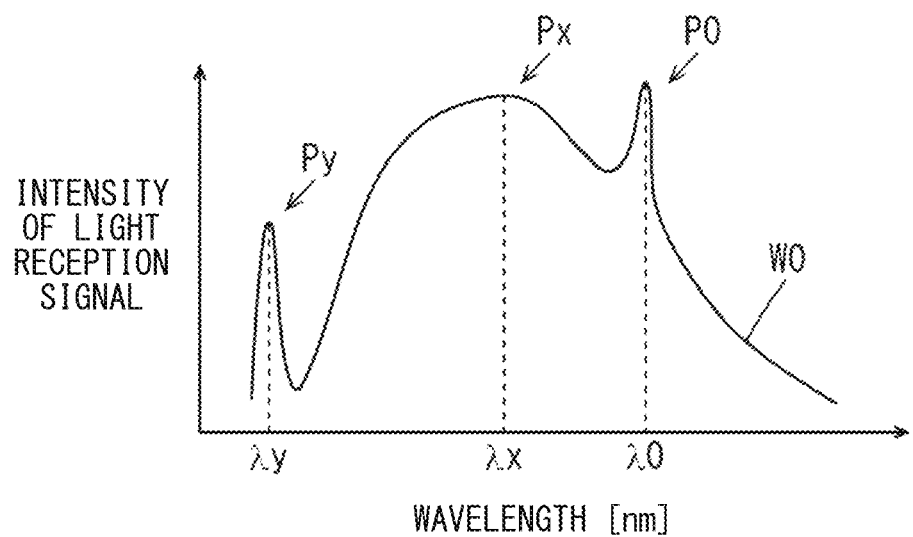
FIG. 6 is a diagram showing a light reception waveform including an unnecessary component.

FIG. 6 is a diagram showing the light reception waveform including the unnecessary component. A light reception waveform W0 shown in FIG. 6 includes three peaks P0, Px, and Py. The peak P0 is generated by the light reflected while focusing on the surface of the measurement object S. The peak P0 has a steep shape. A peak wavelength is $\lambda 0$. The peak Px is generated by light including, for example, a component corresponding to the unnecessary light shown in FIG. 5 and reflected on the portion different from the measurement object S. The peak Px has a smooth shape. A peak wavelength is $\lambda x$. The peak Py is generated by light of the light source 121 (FIG. 4B) having an oscillation wavelength $\lambda y$. More specifically, the peak Py is generated by unnecessary light generated by the light source 121 (FIG. 4B), guided to the surface of the measurement object S while passing through the phosphor 122 (FIG. 4B), and reflected without focusing on the surface of the measurement object S. The peak Py has a steep shape. A peak wavelength is $\lambda y$.

The peak wavelength $\lambda x$ is relatively close to the peak wavelength $\lambda 0$. The peak Px is wide. Therefore, the peak P0 is buried in the peak Px. In this case, it is difficult to accurately specify the peak wavelength $\lambda 0$. Therefore, unnecessary component removal correction for removing a portion due to the peak Px (hereinafter referred to as base waveform BL) from the light reception waveform W0 as an unnecessary component is performed.

Figure 7:
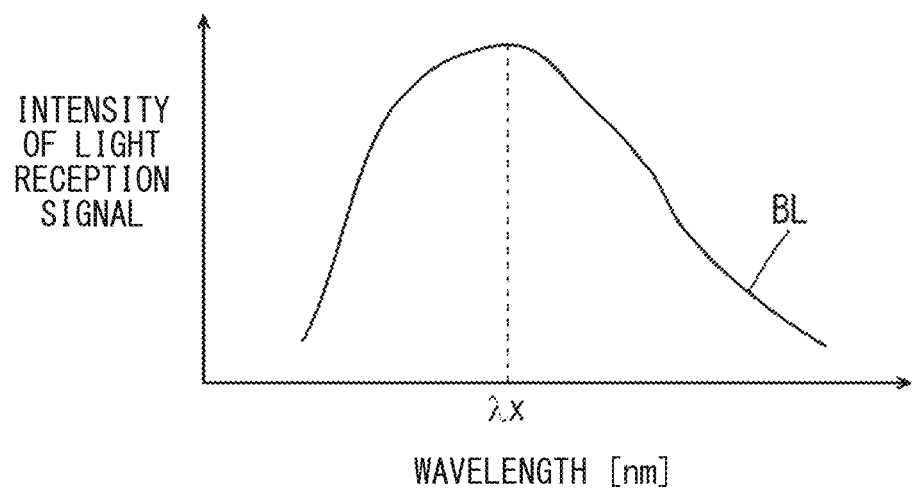
FIG. 7 is a diagram showing a base waveform of a light reception waveform.

FIG. 7 is a diagram showing the base waveform BL of the light reception waveform W0. In this embodiment, the control section 152 applies low-pass filter processing for identifying the peak Px and the peak P0 to the light reception waveform W0 to thereby acquire the base waveform BL shown in FIG. 7. A method of acquiring the base waveform BL is not limited to the method explained above. Data indicating the base waveform BL may be stored in advance in the storing section 151 shown in FIG. 1. In this case, the control section 152 performs, on the basis of the acquired base waveform BL shown in FIG. 7, correction of the light reception waveform W0 to remove the base waveform BL from the light reception waveform W0 shown in FIG. 6.

Figure 8:
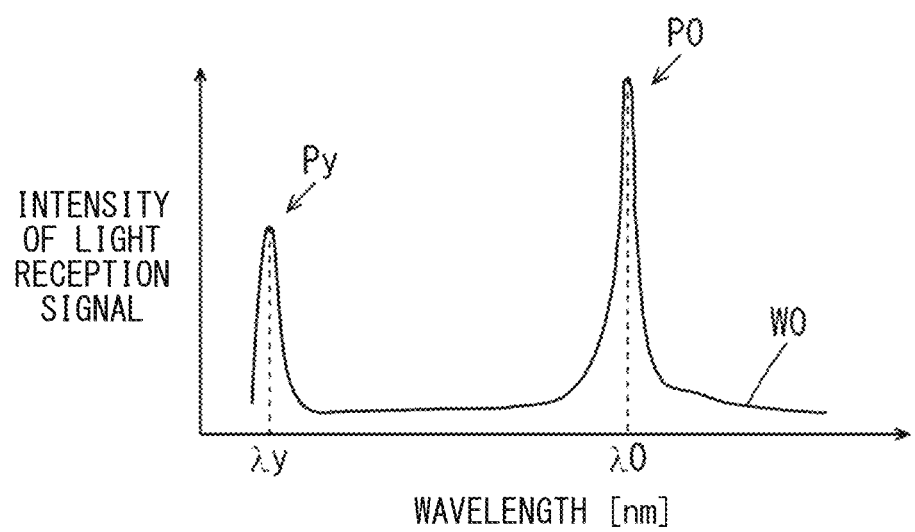
FIG. 8 is a diagram showing a light reception waveform from which the base waveform is removed.

FIG. 8 is a diagram showing the light reception waveform W0 from which the base waveform BL is removed. In an example shown in FIG. 8, the peak wavelength $\lambda 0$ slightly further shifts to the short wavelength side than the peak wavelength $\lambda 0$ shown in FIG. 6. In this way, by removing the base waveform BL from the light reception waveform W0, it is possible to more accurately specify the peak wavelength $\lambda 0$. As a result, it is possible to more accurately calculate a measurement distance.

A portion due to the peak Py of the light receipt waveform W0 shown in FIG. 6 does not affect accurate specifying of the peak wavelength $\lambda 0$. Therefore, in the unnecessary component removal correction, the portion due to the peak Py of the light reception waveform W0 may not be removed from the light reception waveform W0 or may be removed from the light reception waveform W0. When the portion due to the peak Py is close to a range of a waveform corresponding to the measurement range MR (FIG. 2), it is desirable to remove, from the light reception waveform W0, the portion due to the peak Py of the light reception waveform W0 together with the base waveform BL.

Note that, in this embodiment, since the intensity of excitation light emitted from the light source 121 formed of the laser diode is excessively large with respect to intensity suitable for measurement of displacement, light having a wavelength component equivalent to the excitation light is set as unnecessary light. Therefore, if the intensity of the excitation light emitted by the light source 121 is within a range suitable for the measurement of displacement, the excitation light may be used for the measurement of displacement.

Figure 9:
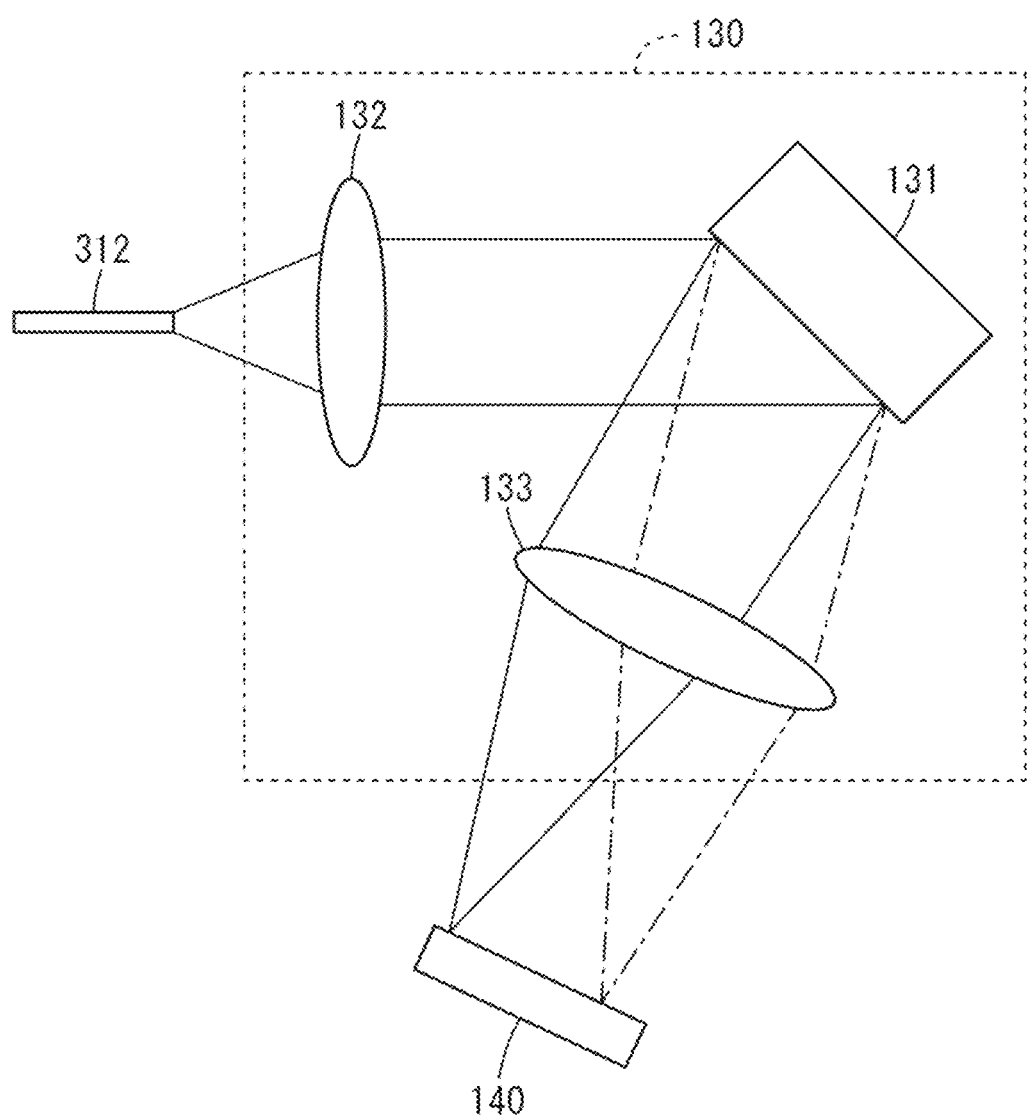
FIG. 9 is a diagram showing a path of light guided to the light receiving section.

Still another example of the unnecessary light is explained. FIG. 9 is a diagram showing a path of light guided to the light receiving section 140. As shown in FIG. 9, in addition to primary light spectrally dispersed by the diffraction grating 131, zero-th order light zero-th order diffracted (in this example, regularly reflected) by the diffraction grating 131 is guided to the light receiving section 140. In FIG. 9, the primary light is indicated by a solid line and the zero-th order light is indicated by an alternate long and short dash line.

Figure 10:
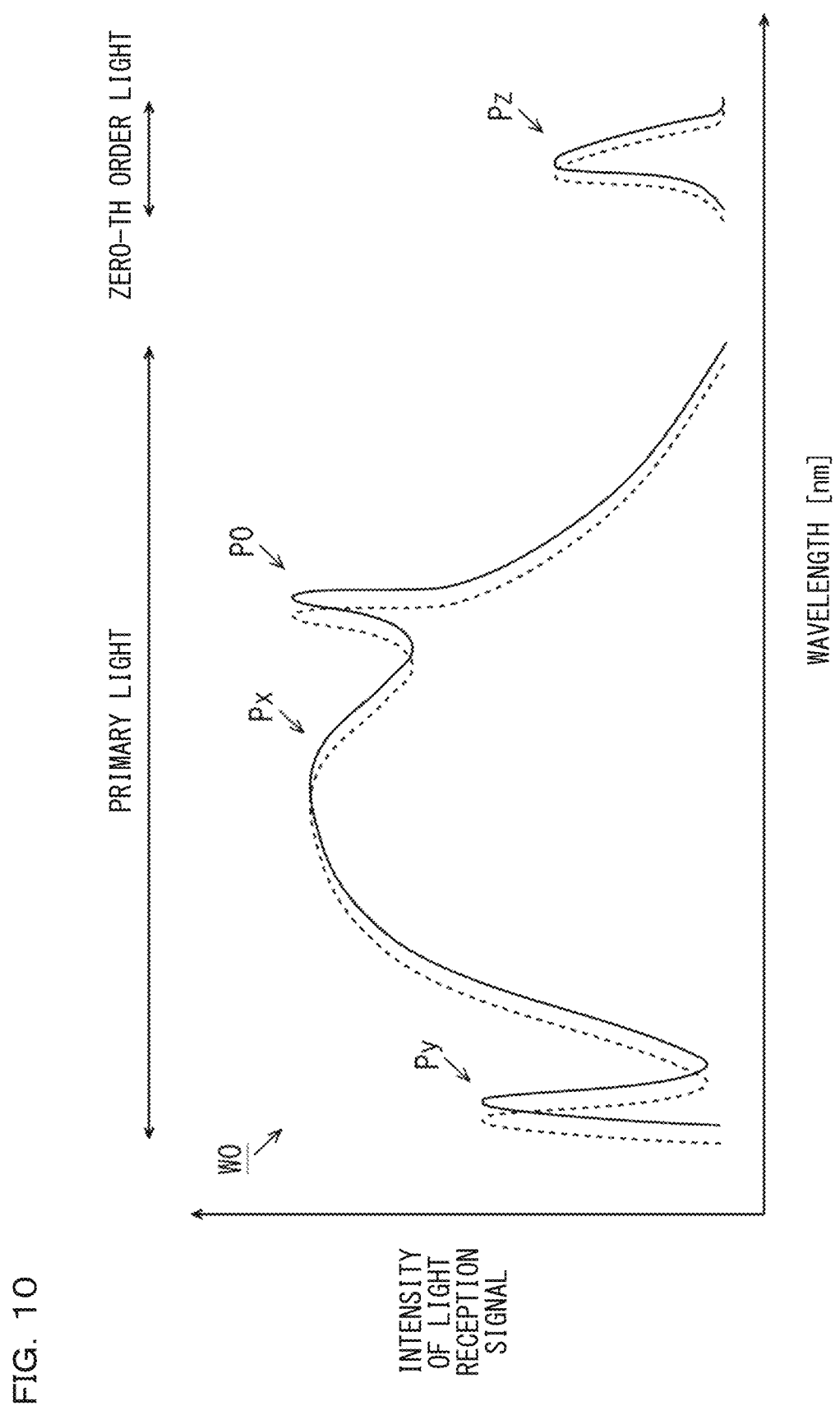
FIG. 10 is a diagram showing a light reception waveform of the light guided to the light receiving section shown in FIG. 9.

FIG. 10 is a diagram showing the light reception waveform W0 of the light guided to the light receiving section 140 shown in FIG. 9. As shown in FIG. 10, the light reception waveform W0 includes a portion corresponding to the primary light and a portion corresponding to the zero-th order light. Like the light reception waveform W0 shown in FIG. 6, the portion of the light reception waveform W0 corresponding to the primary light includes three peaks P0, Px, and Py. The portion of the light reception waveform W0 corresponding to the zero-th order light includes one peak Pz.

The zero-th order light is reflected in a fixed direction by the diffraction grating 131 irrespective of a wavelength. The diffraction grating 131 is disposed such that the zero-th order light is not received by the pixels corresponding to the measurement range MR (FIG. 2). Therefore, the zero-th order light is not used for the calculation of a measurement distance. As shown in FIG. 10, when the light reception waveform W0 includes a component of the zero-th order light as the unnecessary light, in the unnecessary component removal correction, a portion due to the peak Pz of the light reception waveform W0 may not be removed from the light reception waveform W0 or may be removed from the light reception waveform W0.

(b) Light Reception Waveform Shift Correction and Light Reception Waveform Scale Correction In the following explanation, the unnecessary light emitted from the light projecting section 120 and reflected on the lens unit 220 and received by the light receiving section 140 as explained in the example shown in FIG. 5 is referred to as first unnecessary light. The unnecessary light generated by the light source 121, guided to the surface of the measurement object S while passing through the phosphor 122, reflected without focusing on the surface of the measurement object S, and received by the light receiving section 140 is referred to as second unnecessary light. Further, the zero-th order light generated by the diffraction grating 131 and received by the light receiving section 140 as explained in the example shown in FIG. 9 is referred to as third unnecessary light.

As explained above, the light having the specific wavelength is received by the pixel of the light receiving section 140 associated with the wavelength. However, the light having the specific wavelength is sometimes received by a pixel different from the pixel associated with the wavelength in advance because of a change of the position of a light receiving surface of the light receiving section 140 or a change of a tilt of the light receiving surface involved in a peripheral temperature change. In this case, a measurement distance cannot be accurately calculated because a measurement result fluctuates according to a temperature change. Therefore, light reception waveform shift correction and light reception waveform scale correction explained below are performed. The light reception waveform shift correction is processing for correcting a shift on the wavelength axis of the light reception waveform W0 that depends on temperature. The light reception waveform scale correction is processing for correcting a scale on the wavelength axis of the light reception waveform W0 that depends on temperature.

The light reception waveform W0 at the time when the displacement of the measurement object S is measured includes, for example, as shown in FIG. 10, the peaks Px, Py, and Pz respectively corresponding to the first to third unnecessary lights together with the peak P0 that depends on the displacement of the measurement object S.

Since the first unnecessary light does not reach the measurement object S, the peak Px does not depend on the displacement of the measurement object S. Since the second unnecessary light has the oscillation wavelength λy of the light source 121, the peak Py does not depend on the displacement of the measurement object S. Since the third unnecessary light is received by the specific pixel of the light receiving section 140 irrespective of a wavelength, the peak Pz does not depend on the displacement of the measurement object S. In the light reception waveform shift correction, at least one of the three peaks Px, Py, and Pz is used. In the light reception waveform scale correction, at least two of the three peaks Px, Py, and Pz are used.

In order to perform the light reception waveform shift correction, in the storing section 151 shown in FIG. 1, a wavelength where the center of at least one of the peaks Px, Py, and Pz should appear is stored in advance as a reference wavelength. The control section 152 specifies wavelengths of the peaks Px to Pz corresponding to the reference wavelength stored in the storing section 151. The control section 152 compares the specified wavelengths of the peaks Px to Pz and the reference wavelength to thereby calculate a shift amount on the wavelength axis of the light reception waveform W0 and corrects a shift on the wavelength axis of the light reception waveform W0 on the basis of the calculated shift amount. In FIG. 10, the light reception waveform W0 after the correction of the shift on the wavelength axis of the light reception waveform W0 is indicated by a dotted line.

In order to perform the light reception waveform scale correction, in the storing section 151, an interval of a wavelength where the center of at least two of the peaks Px, Py, and Pz should appear is stored in advance as a reference interval. The control section 152 specifies an interval of the peaks Px to Pz corresponding to the reference interval stored in the storing section 151. The control section 152 compares the specified interval of the peaks Px to Pz and the reference interval to thereby calculate deviation of a scale on the wavelength axis of the light reception waveform W0 and corrects a scale on the wavelength axis of the light reception waveform W0 on the basis of the calculated deviation of the scale.

As correction concerning a temperature characteristic of the light receiving section 140, only one of the light reception waveform shift correction and the light reception waveform scale correction may be performed or both of the light reception waveform shift correction and the light reception waveform scale correction may be performed. The light reception waveform shift correction and the light reception waveform scale correction are performed earlier than the unnecessary component removal correction explained above. It is possible to more accurately calculate a measurement distance by specifying the peak P0 of the light reception waveform W0 after the light reception waveform shift correction and the light reception waveform scale correction are performed.

A light reception signal on which the unnecessary component removal correction, the light reception waveform shift correction, and light reception waveform scale correction are performed in the control section 152 is given to the PC 600. In this case, the CPU 601 can perform the displacement measurement processing on the basis of an appropriately corrected light reception signal.

(5) Basic Use Example of the Confocal Displacement Sensor

A basic use example is explained concerning the confocal displacement sensor 500. In the following use example, it is assumed that a power supply of the confocal displacement sensor 500 is turned on in an initial state. It is assumed that the CPU 601 is in the measurement mode.

First, the user fixes the measurement object S on a placement table for displacement measurement. Thereafter, the user roughly positions the measurement head 200 with respect to the measurement object S such that light emitted from the measurement head 200 is irradiated on the measurement object S. The measurement head 200 is fixed to a desired position of the user in a desired posture by a clamp member or the like.

Figure 11:
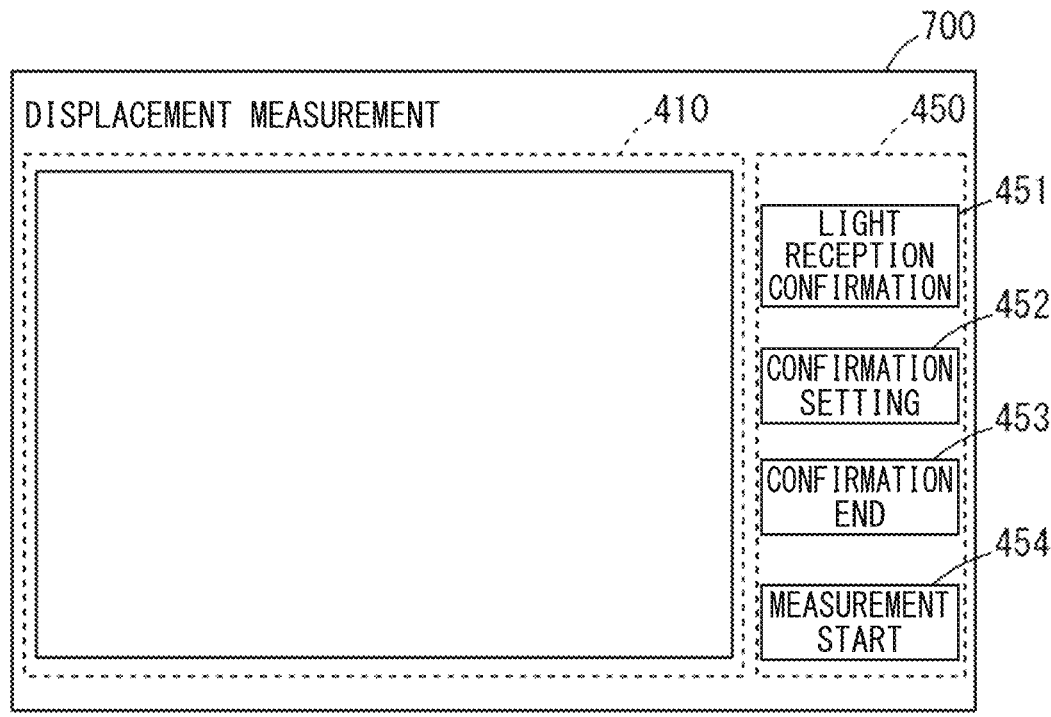
FIG. 11 is a diagram showing a display example of a main display section in an initial state of the confocal displacement sensor according to the first embodiment.

FIG. 11 is a diagram showing a display example of the main display section 700 in the initial state of the confocal displacement sensor 500 according to the first embodiment. As shown in FIG. 11, for example, a first display region 410 and a second display region 450 are set in the main display section 700. In the initial state, nothing is displayed in the first display region 410. On the other hand, a light reception confirmation button 451, a confirmation setting button 452, a confirmation end button 453, and a measurement start button 454 are displayed in the second display region 450.

As explained above, unless a relative position and a relative posture of the measurement head 200 with respect to the measurement object S are appropriate, it is difficult to accurately measure displacement of the measurement object S. Therefore, in order to more appropriately adjust the position and the posture of the measurement head 200, the user operates the light reception confirmation button 451 using the operation section 800 shown in FIG. 1. In this case, the CPU 601 shown in FIG. 1 is switched from the measurement mode to the confirmation mode. In the confirmation mode, change information is generated at a fixed cycle by the CPU 601. The generated change information is displayed in the first display region 410. Specific content and a display example of the change information are explained below.

In this state, the user can more appropriately position the measurement head 200 by finely adjusting the position and the posture of the measurement head 200 while confirming the change information.

When the positioning of the measurement head 200 is completed, the user operates the confirmation end button 453 using the operation section 800 shown in FIG. 1. Consequently, an operation mode of the CPU 601 shown in FIG. 1 is switched from the confirmation mode to the measurement mode. Thereafter, the user can measure displacement of the measurement object S by operating the measurement start button 454.

Figure 12:
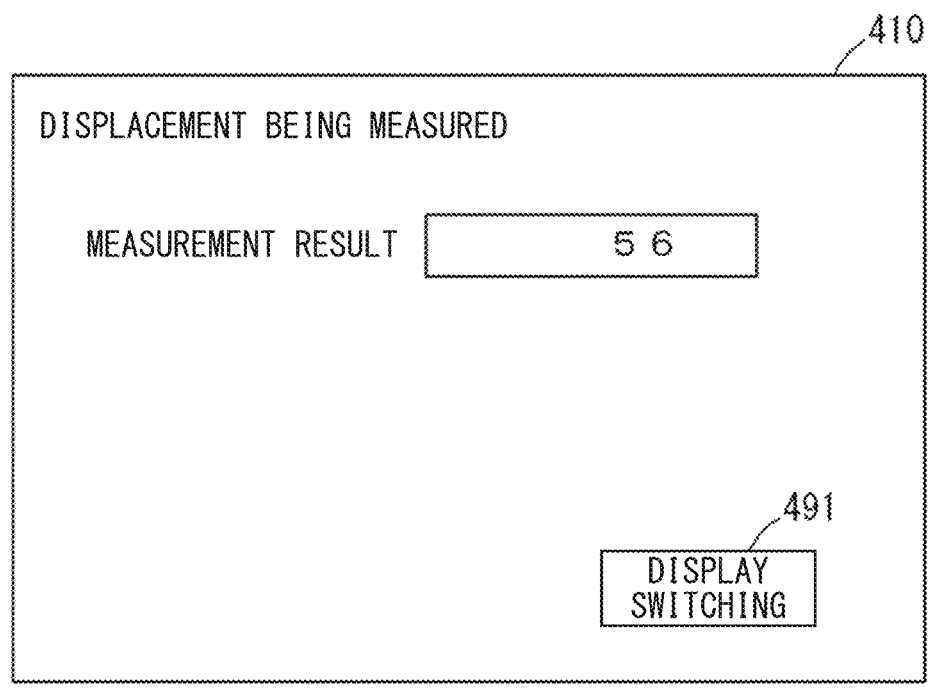
FIG. 12 is a diagram showing an example of a measurement result displayed in a first display region shown in FIG. 11.
Figure 13:
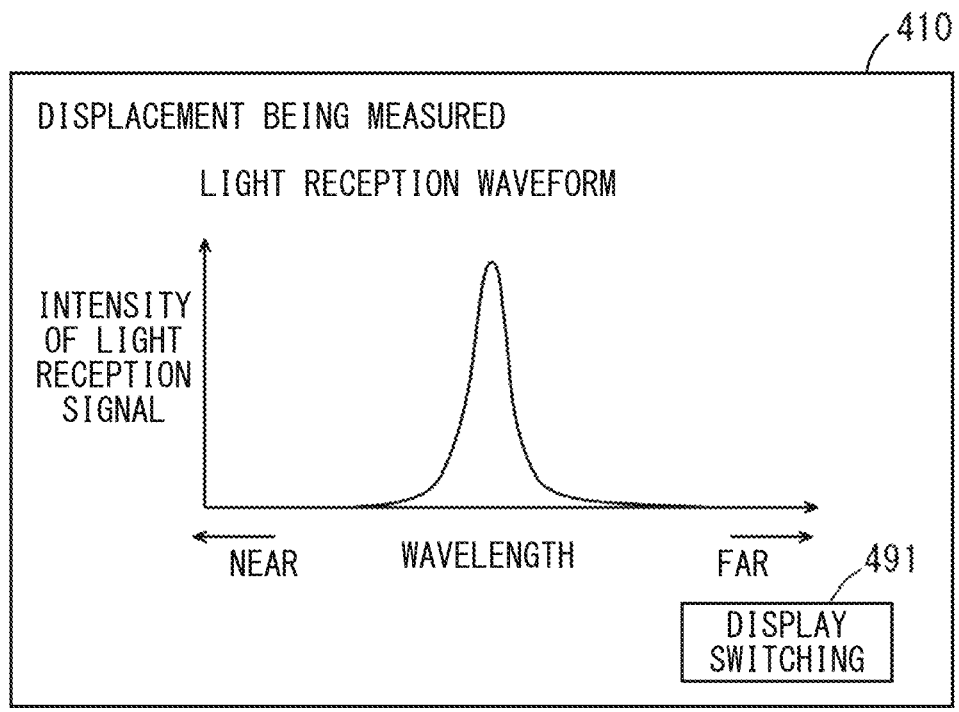
FIG. 13 is a diagram showing an example of a light reception waveform displayed in the first display region shown in FIG. 11.

When displacement of the measurement object S is measured in a state in which the CPU 601 is in the measurement mode, a numerical value indicating a measurement result or a light reception waveform acquired at the present point in time is displayed in the first display region 410 shown in FIG. 11. FIG. 12 is a diagram showing an example of the measurement result displayed in the first display region 410 shown in FIG. 11. FIG. 13 is a diagram showing an example of the light reception waveform displayed in the first display region 410 shown in FIG. 11.

In the example shown in FIG. 12, a numerical value indicating a measurement result of displacement is displayed and a switching button 491 is displayed in the first display region 410. In the example shown in FIG. 13, a light reception waveform acquired at the present point in time is displayed and the switching button 491 is displayed in the first display region 410. The user can switch a display state of the first display region 410 to a display state of the light reception waveform shown in FIG. 13 by operating the switching button 491 shown in FIG. 12 using the operation section 800 shown in FIG. 1. The user can switch the display state of the first display region 410 to a display state of the measurement result by the numerical value shown in FIG. 12 by operating the switching button 491 shown in FIG. 13 using the operation section 800 shown in FIG. 1.

In a state in which the CPU 601 is in the confirmation mode, during the light reception confirmation processing, the CPU 601 can determine propriety of the position and the posture of the measurement head 200 (hereinafter referred to as propriety determination) on the basis of whether a peak value of a light reception signal is higher than a certain threshold and cause the main display section 700 to display a result of the determination together with the change information. The CPU 601 can use only a peak within a certain wavelength range for the propriety determination. Further, the CPU 601 can display the change information on the main display section 700 in various forms.

Various kinds of information including the threshold of the propriety determination used in the light reception confirmation processing, the wavelength range of the propriety determination, and the display forms are stored in the memory 602 shown in FIG. 1 as setting information. The user can cause the memory 602 to store desired setting information by operating the confirmation setting button 452 shown in FIG. 11 and inputting those kinds of information using the operation section 800 shown in FIG. 1.

Figure 14:
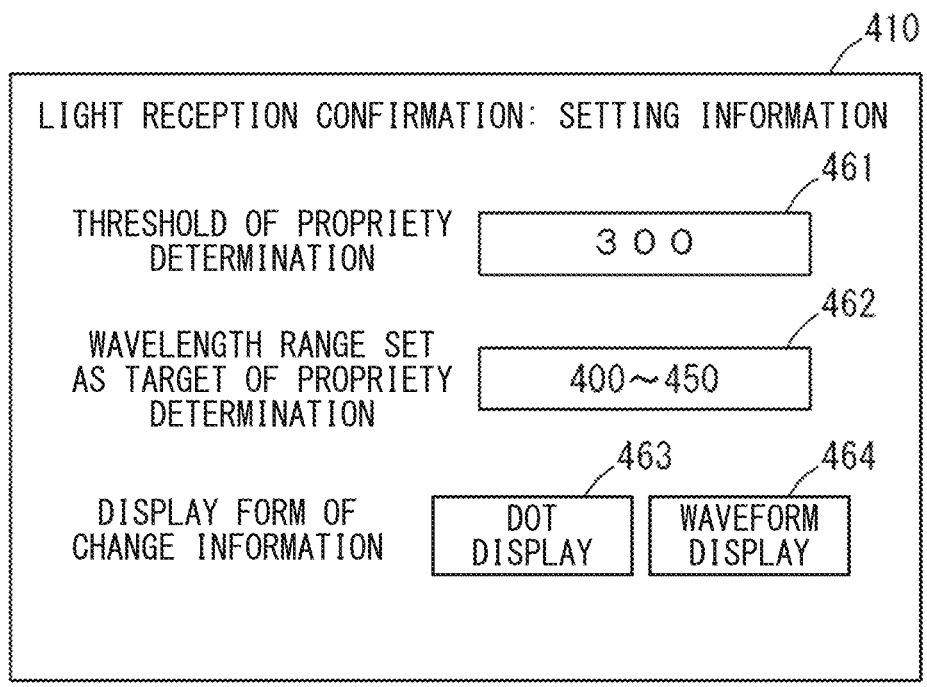
FIG. 14 is a diagram showing an example of an input screen of setting information displayed in the first display region shown in FIG. 11.

FIG. 14 is a diagram showing an example of an input screen for setting information displayed in the first display region 410 shown in FIG. 11. In the example shown in FIG. 14, two input fields 461 and 462 and two display form buttons 463 and 464 are displayed in the first display region 410. One input field 461 is used by the user to designate the threshold of the propriety determination. The other input field 462 is used by the user to designate the wavelength range of the propriety determination. The display form buttons 463 and 464 are used by the user to select whether a change of peak values of light reception amounts from a point in time before the present point in time to the present point in time is displayed by, for example, a dot plot graph or a waveform graph as the change information.

Note that the threshold of the propriety determination may be respectively set to different values concerning a plurality of wavelength ranges. In this case, on a setting screen, for example, a plurality of input fields for inputting a plurality of thresholds respectively corresponding to the plurality of wavelength ranges may be displayed. The threshold of the propriety determination may be stored in the memory 602 in advance by a manufacturer of the confocal displacement sensor 500.

FIGS. 15 to 20 are diagrams showing examples of the change information displayed in the first display region 410 shown in FIG. 11 by the light reception confirmation processing. In the example shown in FIG. 15, the change information includes a peak value of a light reception signal acquired at the present point in time (hereinafter referred to as present peak value), a maximum of peak values of light reception signals acquired from a start of the light reception confirmation processing until the present point in time (hereinafter referred to as maximum peak value in the past), and a dot plot graph that shows a change of the peak values of the light reception signals from the start of the light reception confirmation processing until the present point in time. A propriety determination result of the position and the posture of the measurement head 200 is also displayed.

Figure 15:
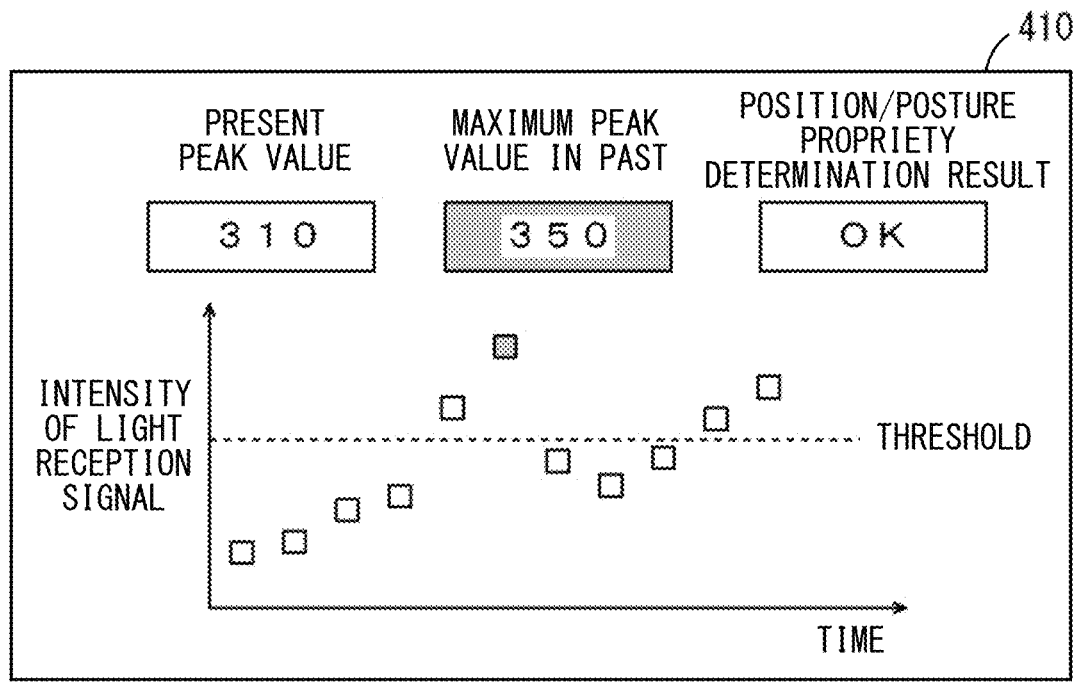
FIG. 15 is a diagram showing an example of change information displayed in the first display region shown in FIG. 11 by light reception confirmation processing.

In the dot plot graph of FIG. 15, the horizontal axis indicates time and the vertical axis indicates the intensity of a light reception signal. In the dot plot graph, peak values of light reception signals acquired by the control section 152 at a fixed cycle from the start of the light reception confirmation processing are displayed as dots and the threshold of the propriety determination set in advance is indicated by a dotted line. Note that the user may be able to set a display cycle of the peak values and a scale of the horizontal axis.

Further, in the example shown in FIG. 15, as indicated by hatching, the maximum peak value in the past and a dot corresponding to the peak value are highlighted. Consequently, the user can easily recognize a change over time of the peak values of the light reception signals by visually recognizing the main display section 700. Therefore, it is possible to adjust the position and the posture of the measurement head 200 such that a higher peak can be obtained.

In the example shown in FIG. 15, a position/posture propriety determination result is displayed. The position/posture propriety determination result is displayed as "OK" when a peak value of a light reception signal exceeds the threshold and displayed as "NG" when a peak value of a light reception signal does not exceed the threshold. When the position/posture propriety determination result is displayed as "OK", the user is urged to end the adjustment. The threshold for displaying "OK" or "NG" of the position/posture propriety determination result may be the same as or may be different from the threshold of the propriety determination set by the screen shown in FIG. 14.

For example, the position/posture propriety determination result may be displayed as "OK" if the position/posture propriety at the present point in time is better than in the past. The position/posture propriety determination result may be displayed as "OK" when the position/posture propriety at the present point in time is better than the position/posture propriety in the past and is higher than a minimum limit range in which the confocal displacement sensor 500 can measure the measurement object S.

When the position/posture propriety determination result is in a range in which further adjustment of the position and the posture does not greatly affect accuracy of measurement, an adjustment end is notified to the user to urge the user to shift to a step of displacement measurement.

Figure 16:
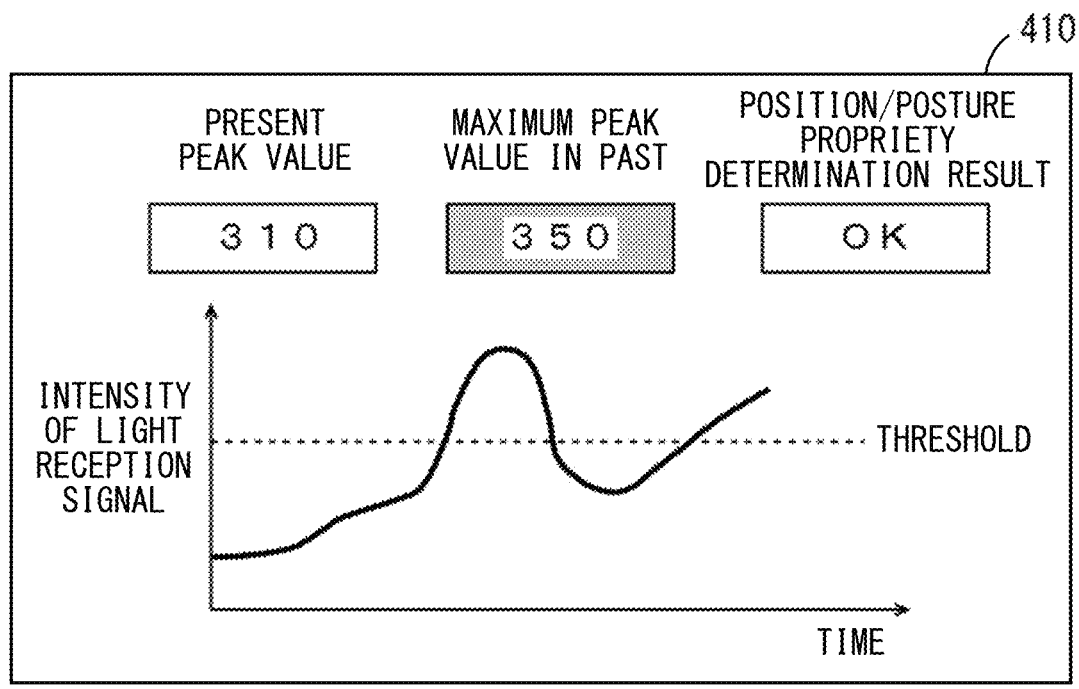
FIG. 16 is a diagram showing an example of the change information displayed in the first display region shown in FIG. 11 by the light reception confirmation processing.

The example shown in FIG. 16 is the same as the example shown in FIG. 15 except points explained below. In the example shown in FIG. 16, the change of the peak values of the light reception signals from the start of the light reception confirmation processing to the present point in time is displayed by a waveform graph instead of the dot plot graph shown in FIG. 15.

Figure 17:
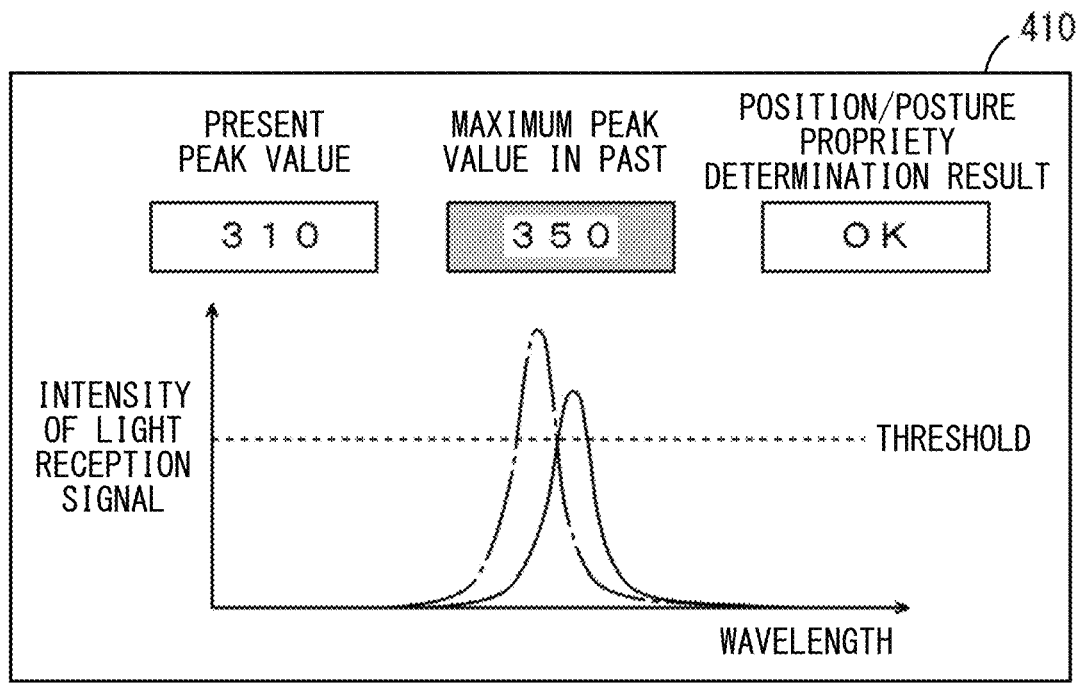
FIG. 17 is a diagram showing an example of the change information displayed in the first display region shown in FIG. 11 by the light reception confirmation processing.

In the example shown in FIG. 17, the present peak value and the maximum peak value in the past are displayed as the change information. A waveform graph including a light reception waveform at the present point in time and a light reception waveform at the time when the maximum peak value in the past is obtained is displayed as the change information. Further, the propriety determination result of the position and the posture of the measurement head 200 is displayed.

In the waveform graph of FIG. 17, the horizontal axis indicates a wavelength of light received by the light receiving section 140 and the vertical axis indicates the intensity of a light reception signal. In the waveform graph, the light reception waveform at the time when the maximum peak value in the past is obtained is indicated by an alternate long and short dash line and the light reception waveform at the present point in time is indicated by a solid line. Consequently, the user can adjust the position and the posture of the measurement head 200 such that a peak of the light receptor waveform at the present point in time exceeds a peak of the light reception waveform in the past indicated by the alternate long and short dash line while visually recognizing the main display section 700.

The wavelength indicated by the horizontal axis of the waveform graph shown in FIG. 17 corresponds to the distance between the measurement object S and the measurement head 200 in the optical axis direction of the measurement head 200. Therefore, the user can recognize a positional relation between the measurement object S and the measurement head 200 in the optical axis direction of the measurement head 200 by visually recognizing a light reception waveform at the present point in time. Consequently, the user can easily adjust the position of the measurement head 200 such that a peak wavelength of the light reception signal is within a range of a wavelength corresponding to the measurement range MR shown in FIG. 2.

Figure 18:
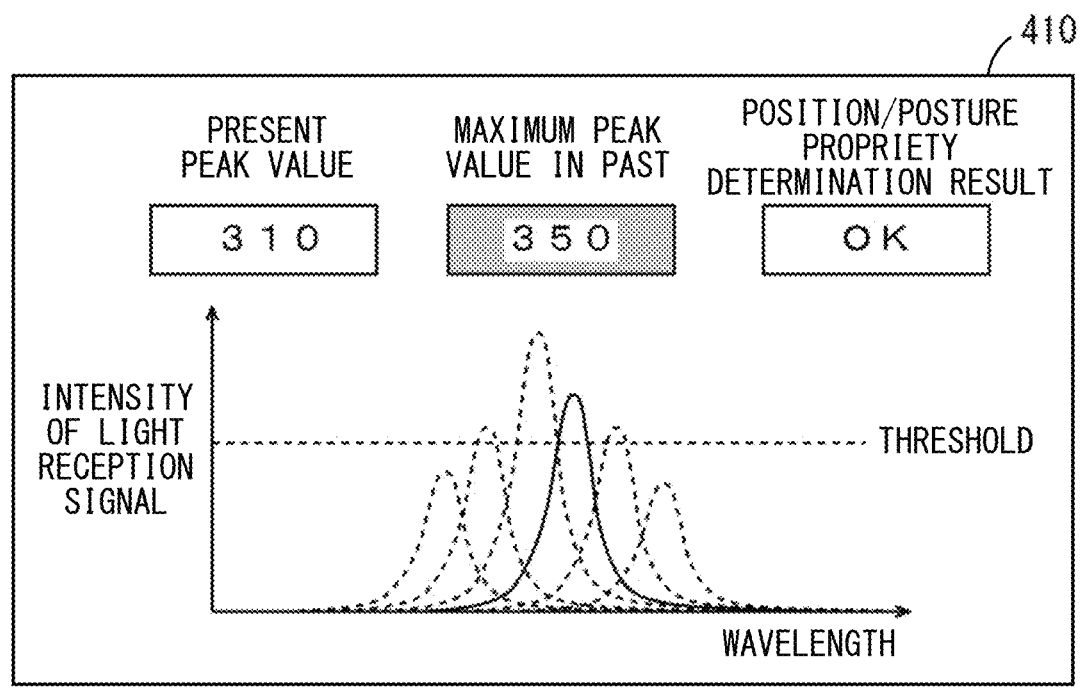
FIG. 18 is a diagram showing an example of the change information displayed in the first display region shown in FIG. 11 by the light reception confirmation processing.

The example shown in FIG. 18 is the same as the example shown in FIG. 17 except points explained below. In the example shown in FIG. 18, a waveform graph including a light reception waveform at the present point in time and a plurality of light reception waveforms acquired by the control section 152 at a fixed cycle from the start of the light reception confirmation processing is displayed instead of the waveform graph shown in FIG. 17.

In the waveform graph shown in FIG. 18, the horizontal axis indicates the wavelength of light received by the light receiving section 140 and the vertical axis indicates the intensity of a light reception signal. In the waveform graph, a plurality of light reception waveforms acquired in the past are indicated by dotted lines and the light reception waveform at the present point in time is indicated by a solid line. Consequently, the user can adjust the position and the posture of the measurement head 200 such that a peak of the light reception signal at the present point in time exceeds peaks of the plurality of light reception waveforms in the past indicated by the dotted lines while visually recognizing the main display section 700.

Figure 19:
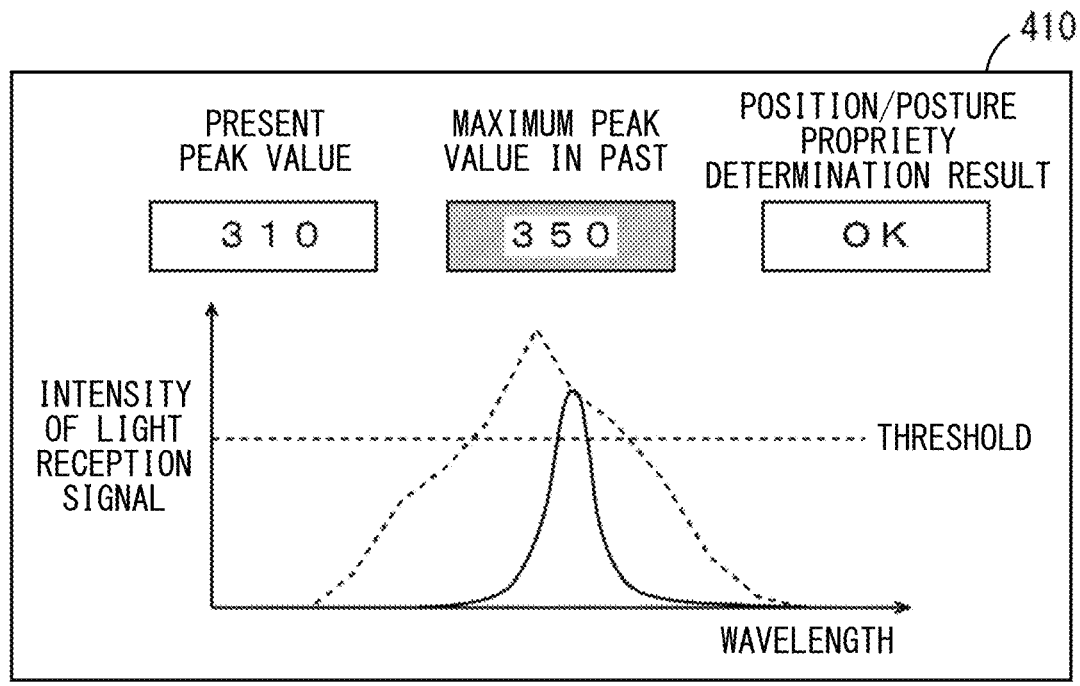
FIG. 19 is a diagram showing an example of the change information displayed in the first display region shown in FIG. 11 by the light reception confirmation processing.

The example shown in FIG. 19 is the same as the example shown in FIG. 17 except points explained below. In the example shown in FIG. 19, a waveform graph including a light reception waveform at the present point in time and an envelope connecting peaks of a plurality of light reception waveforms acquired by the control section 152 from the start of the light reception confirmation processing is displayed instead of the waveform graph shown in FIG. 17.

In the waveform graph shown in FIG. 19, the horizontal axis indicates the wavelength of light received by the light receiving section 140 and the vertical axis indicates the intensity of a light reception signal. In the waveform graph, an envelope connecting peaks of a plurality of light reception waveforms acquired in the past is indicated by a dotted line and the light reception waveform at the present point in time is indicated by a solid line. Consequently, the user can adjust the position and the posture of the measurement head 200 such that the height of a peak of the light reception signal at the present point in time approaches a highest point of the envelope indicated by the dotted line or exceeds the highest point while visually recognizing the main display section 700.

Figure 20:
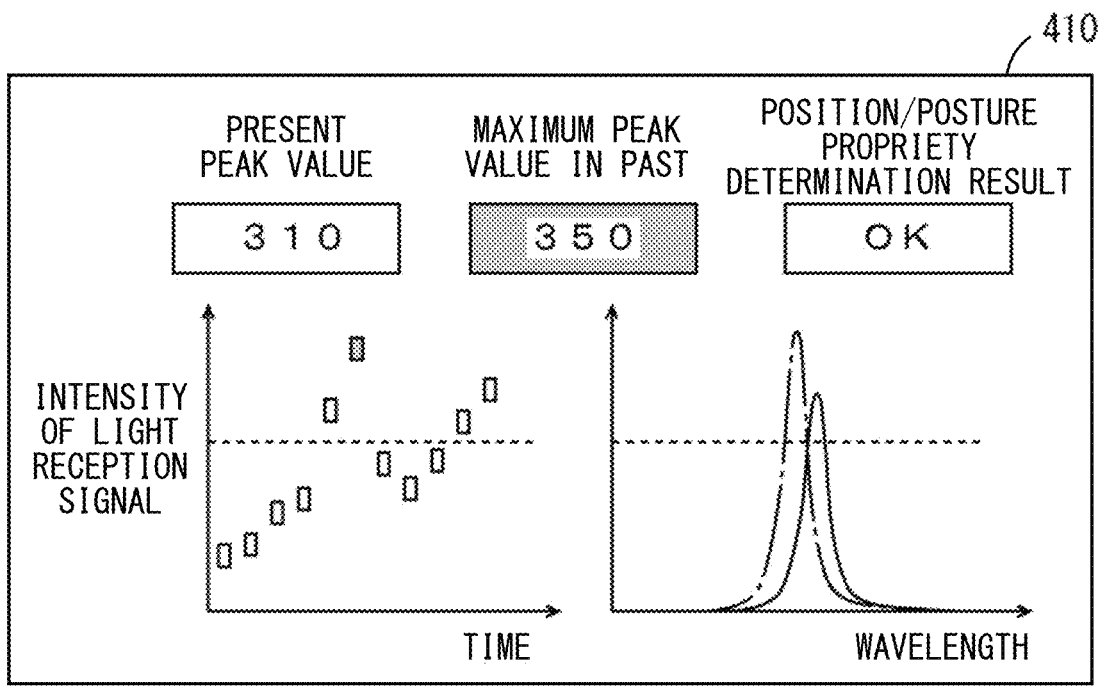
FIG. 20 is a diagram showing an example of the change information displayed in the first display region shown in FIG. 11 by the light reception confirmation processing.

The example shown in FIG. 20 is the same as the example shown in FIG. 15 except points explained below. In the example shown in FIG. 20, the waveform graph of FIG. 17 is displayed together with the dot plot graph of FIG. 15. In this case, the user can easily recognize a change over time of the peak of the light reception signal and a change over time of the light reception waveform. Note that, in the example shown in FIG. 20, the waveform graph of FIG. 16 may be displayed instead of the dot plot graph displayed on the left side of the first display region 410. The waveform graph of FIG. 18 or 19 may be displayed as the waveform graph displayed on the right side of the first display region 410.

(6) Displacement Measurement Processing

Figure 21:
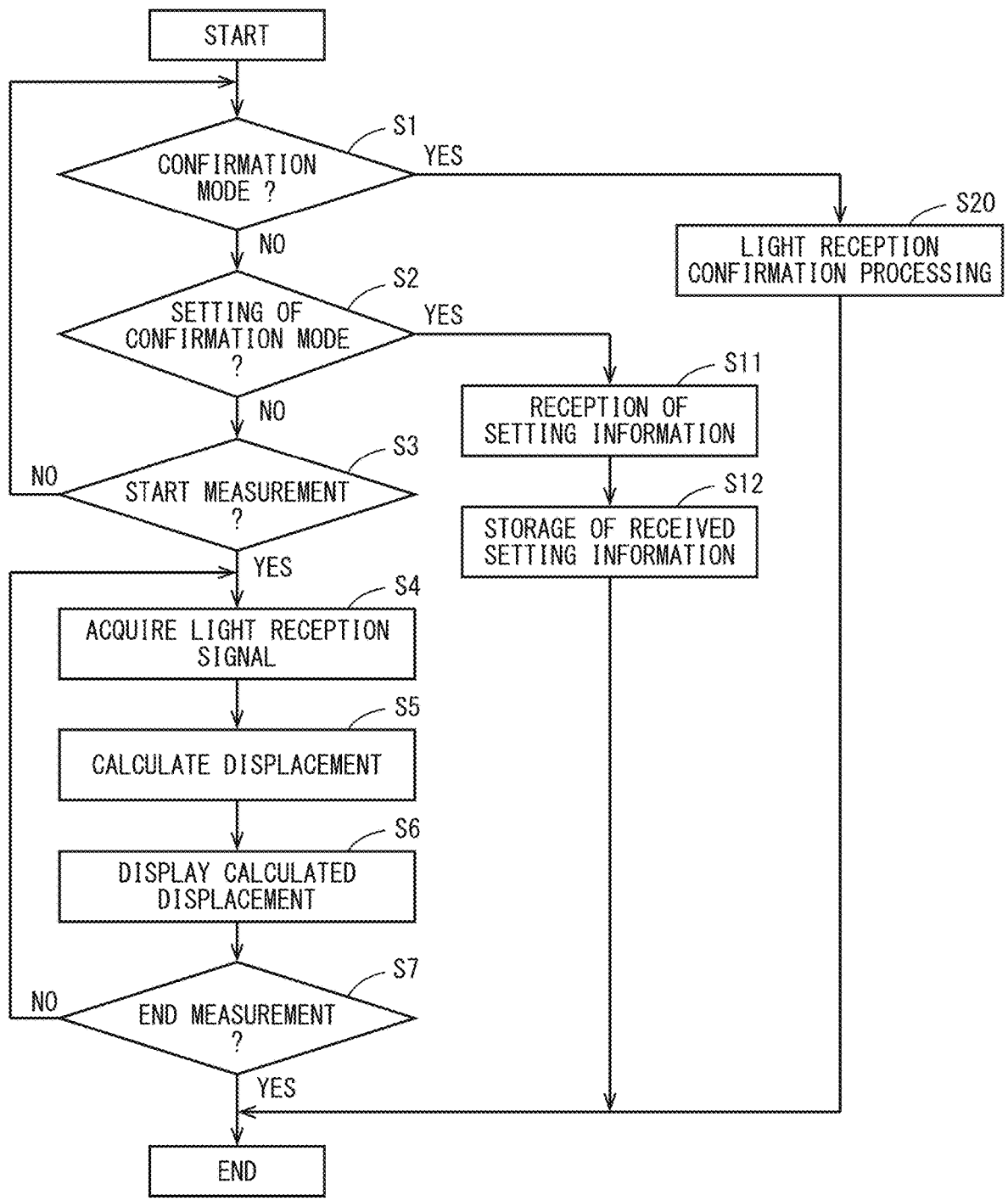
FIG. 21 is a flowchart for explaining displacement measurement processing according to the first embodiment.

FIG. 21 is a flowchart for explaining the displacement measurement processing according to the first embodiment. When the power supply of the confocal displacement sensor 500 is turned on, the CPU 601 shown in FIG. 1 executes the displacement measurement processing explained below at a fixed cycle. In an initial state, the CPU 601 is in the measurement mode. It is assumed that the screen shown in FIG. 11 is displayed on the main display section 700.

First, the CPU 601 determines whether switching to the confirmation mode is instructed by, for example, operating the light reception confirmation button 451 shown in FIG. 11 (step S1). When the switching to the confirmation mode is instructed, the CPU 601 performs light reception confirmation processing in step S20 explained below and thereafter ends the displacement measurement processing.

On the other hand, when the switching to the confirmation mode is not instructed, the CPU 601 determines whether setting of the confirmation mode is instructed by, for example, operating the confirmation setting button 452 shown in FIG. 11 (step S2). When the setting of the confirmation mode is instructed, the control section 152 receives setting information in response to operation of the operation section 800 by the user (step S11), stores the received setting information in the memory 602 (step S12), and ends the displacement measurement processing.

When the setting of the confirmation mode is not instructed in step S2, the CPU 601 determines whether a start of measurement is instructed by, for example, operating the measurement start button 454 shown in FIG. 11 (step S3). When the start of the measurement is not instructed, the CPU 601 executes the processing in step S1.

On the other hand, when the start of the measurement is instructed, the CPU 601 acquires a light reception signal given from the control section 152 (step S4). The unnecessary component removal correction, the light reception waveform shift correction, and the light reception waveform scale correction have been performed by the control section 152 on the light reception signal given from the control section 152.

In the memory 602, as in the storing section 151, a conversion formula for the positions of the pixels of the light receiving section 140, a peak wavelength of an output light reception waveform, and a measurement distance is stored in advance. The CPU 601 calculates displacement of the measurement object S on the basis of the light reception signal after the correction and the conversion formula stored in the memory 602 (step S5). Further, the CPU 601 displays the calculated displacement on the main display section 700 (step S6). Thereafter, the CPU 601 determines whether an end of the measurement is instructed by, for example, the user operating the operation section 800 shown in FIG. 1 (step S7). When the end of the measurement is instructed, the CPU 601 ends the displacement measurement processing. When the end of the measurement is not instructed, the CPU 601 executes the processing in step S4.

Figure 22:
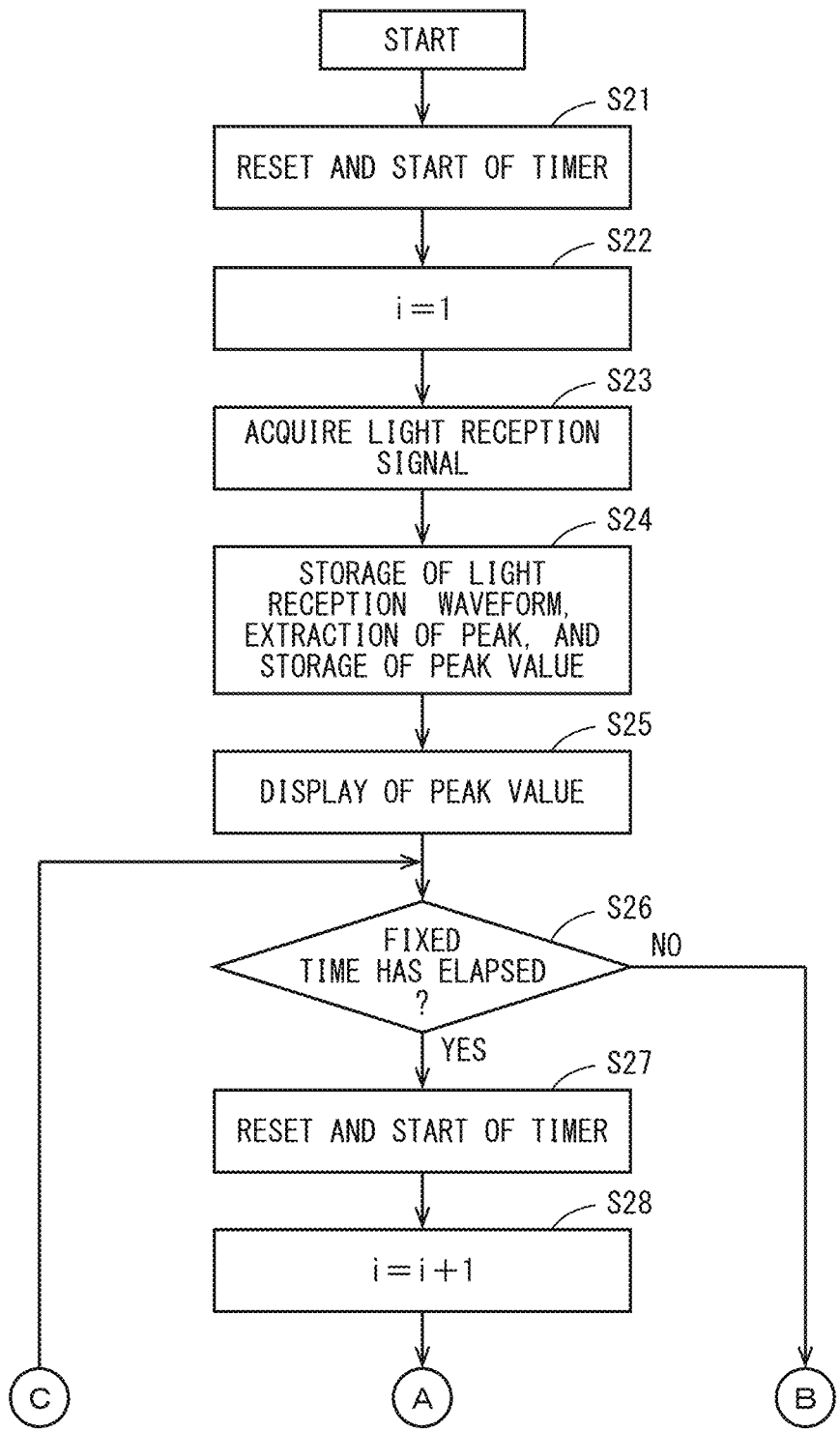
FIG. 22 is a flowchart for explaining the light reception confirmation processing shown in FIG. 21.
Figure 23:
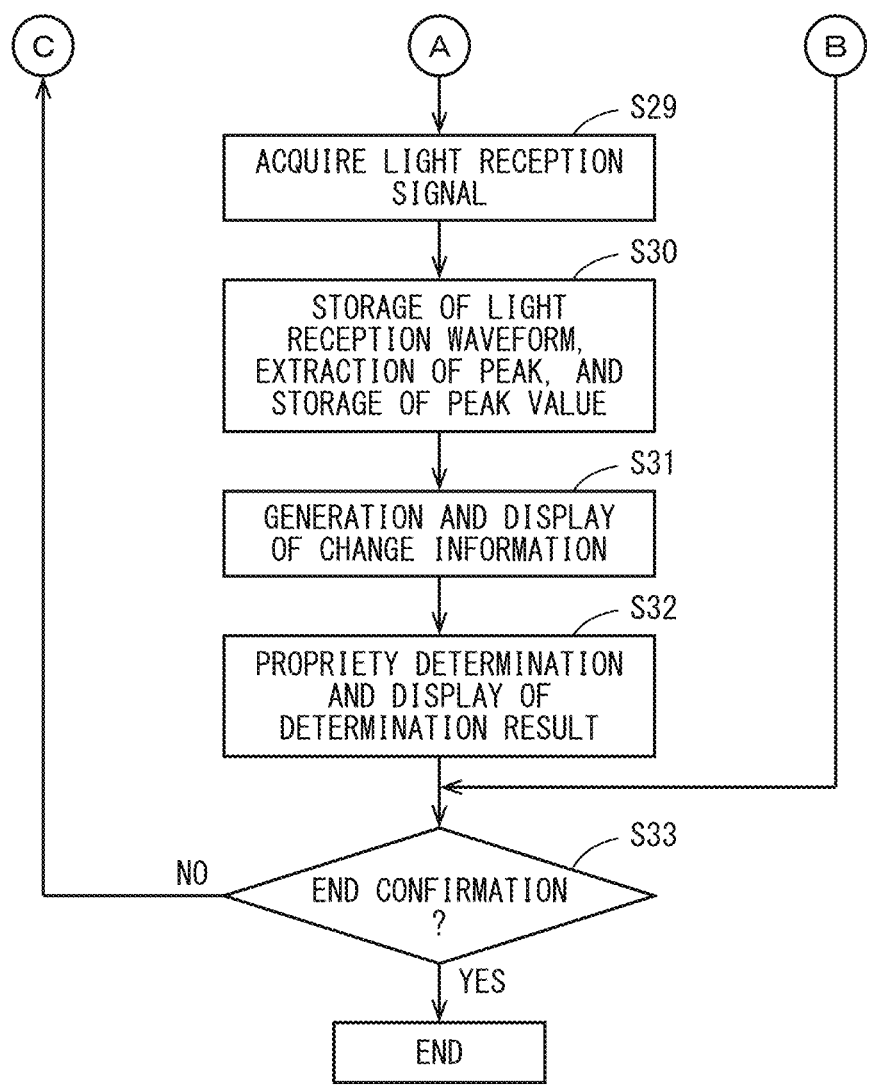
FIG. 23 is a flowchart for explaining the light reception confirmation processing shown in FIG. 21.

FIGS. 22 and 23 are flowcharts for explaining the light reception confirmation processing shown in FIG. 21. As explained above, the light reception confirmation processing shown in FIGS. 22 and 23 is executed when the switching to the confirmation mode is instructed in step S1 in FIG. 21.

First, the CPU 601 resets a timer incorporated in the PC 600 and starts count (step S21). The CPU 601 sets a value of a variable i indicating the number of times of acquisition of light reception signals to 1 (step S22).

Subsequently, the CPU 601 acquires a light reception signal given from the control section 152 (step S23). The unnecessary component removal correction, the light reception waveform shift correction, and the light reception waveform scale correction have been performed by the control section 152 on the light reception signal given from the control section 152. Thereafter, the CPU 601 stores a light reception waveform of the acquired light reception signal in the memory 602 as a first light reception waveform, extracts a peak of the acquired light reception signal, and stores a value of the peak in the memory 602 as a first peak value (step S24). The CPU 601 displays the first peak value stored in the memory 602 on the main display section 700 as a present peak value (step S25).

Subsequently, the CPU 601 determines, on the basis of the count of the timer, whether a fixed period decided in advance has elapsed from the processing in step S21 (step S26). When the fixed time has not elapsed, the CPU 601 executes processing in step S33 explained below. On the other hand, when the fixed time has elapsed, the CPU 601 resets the timer and starts count (step S27). The CPU 601 adds 1 to the value of the variable i (step S28).

Subsequently, the CPU 601 acquires a light reception signal output from the light receiving section 140 (step S29). The unnecessary component removal correction, the light reception waveform shift correction, and the light reception waveform scale correction have been performed by the control section 152 on the light reception signal given from the control section 152. Thereafter, the CPU 601 stores a light reception waveform of the acquired light reception signal in the memory 602 as an i-th light reception waveform, extracts a peak of the acquired light reception signal, and stores a value of the peak in the memory 602 as an i-th peak value (step S30). The CPU 601 generates change information on the basis of the i-th peak value and the i-th light reception waveform and the first to (i−1)-th peak values and the first to (i−1)-th light reception waveforms stored in the memory 602 and displays the generated change information on the main display section 700 (step S31). Note that the change information includes at least one of the first to (i−1)-th peak values and the i-th peak value (the present peak value).

Thereafter, the CPU 601 determines propriety of the position and the posture of the measurement head 200 on the basis of the threshold stored in the memory 602 in advance as the setting information and displays a result of the determination on the main display section 700 (step S32). Note that, when the threshold is not stored in the memory 602, the processing in step S32 may be omitted.

Subsequently, the CPU 601 determines whether an end of the light reception confirmation processing is instructed by, for example, operating the confirmation end button 453 shown in FIG. 11 (step S33). When the end of the light reception confirmation processing is not instructed, the CPU 601 executes the processing in step S26. On the other hand, when the end of the light reception confirmation processing is instructed, the CPU 601 ends the light reception confirmation processing.

When the change information includes a graph showing a change over time of peak values of light reception signals (see FIGS. 15 and 16), the CPU 601 may store the graph at the point in time of the end of the light reception confirmation processing in the storing section 151.

(7) Effects

In the confocal displacement sensor 500 according to the first embodiment, light having a plurality of wavelengths is emitted from the light projecting section 120. A chromatic aberration along the optical axis direction is caused by the lens unit 220 in the light emitted by the light projecting section 120. The light having the chromatic aberration is converged by the lens unit 220 and irradiated on the measurement object S.

In the light irradiated on the measurement object S from the measurement head 200, light having a wavelength reflected while focusing on the surface of the measurement object S passes through the optical fiber 314. The light passed through the optical fiber 314 is guided to the spectral section 130 through the fiber connector 330, the optical fiber 319, the fiber coupler 320, and the optical fiber 312 and spectrally dispersed. The light spectrally dispersed by the spectral section 130 is received by the light receiving section 140. A light reception signal output from the light receiving section 140 is acquired by the control section 152. The control section 152 calculates displacement of the measurement object S on the basis of the acquired light reception signal and gives the acquired light reception signal to the PC 600.

When the position and the posture of the measurement head 200 with respect to the measurement object S change, in the light irradiated on the measurement object S, the intensity of light reflected while focusing on the surface of the measurement object S and input to the optical fiber 314 also changes. When most of the light reflected from the measurement object S passes through the optical fiber 314, the intensity of the light passing through the optical fiber 314 increases. Therefore, a peak value of an acquired light reception signal increases. On the other hand, when most of the light reflected from the measurement object S travels to a position deviating from the optical fiber 314, the intensity of the light passing through the optical fiber 314 decreases. Therefore, the peak value of the acquired light reception signal decreases.

In order to accurately calculate displacement of the measurement object S without being affected by noise and the like, it is desirable that the relation between the relative positions and the relative postures of the measurement head 200 and the measurement object S is adjusted such that a value of the light reception signal becomes higher.

Therefore, in the confocal displacement sensor 500, the CPU 601 operates in the confirmation mode, whereby a change from a peak value of a light reception signal acquired at a point in time before the present point in time to a peak value of a light reception signal acquired at the present point in time is displayed on the main display section 700 as the change information.

In this case, the user can appropriately adjust the position and the posture of the measurement head 200 such that a higher peak value can be obtained while recognizing a change over time of the peak value of the light reception signal by visually recognizing the change information. As a result, the user is capable of easily and accurately measuring the displacement of the measurement object S.

The CPU 601 measures the displacement of the measurement object S in the measurement mode. Consequently, the user can measure the displacement of the measurement object S in the measurement mode after adjusting the position and posture of the measurement head 200 with respect to the measurement object S in the confirmation mode. In this way, it is possible to smoothly perform positioning work of the measurement head 200 and measurement work of the displacement of the measurement object S.

In the light reception confirmation processing, the propriety of the position and the posture of the measurement head 200 is determined on the basis of whether the peak value of the light reception signal is higher than the certain threshold. A result of the determination is displayed on the main display section 700 together with the change information. Consequently, the user can easily recognize the propriety of the position and the posture of the measurement head 200.

In the example explained above, by operating the operation section 800, the user can designate a range of a wavelength set as a determination target when determining the propriety of the position and the posture of the measurement head 200. In this case, the CPU 601 can use only peaks present within the designated wavelength range for the propriety determination. The CPU 601 may display, as the change information, on the main display section 700, a change from a peak value of a light reception signal acquired at a point in time before the present point in time to a peak value of a light reception signal acquired at the present point in time within the designated wavelength range. Therefore, convenience of adjustment of the position and the posture of the measurement head 200 is improved.

As explained above, the control section 152 performs the unnecessary component removal correction, the light reception waveform shift correction, and the light reception waveform scale correction on the light reception signal output from the light receiving section 140. Therefore, an unnecessary component is removed from the light reception signals acquired by the CPU 601 in the processing in steps S4, S23, and S29 in FIGS. 21 to 23. Consequently, it is possible to more accurately calculate displacement of the measurement object S. Therefore, it is possible to reduce an error of the displacement of the measurement object S measured by the confocal displacement sensor 500. It is possible to cause the main display section 700 to more accurately display a peak value of a light reception signal in the light reception confirmation processing.

A shift on the wavelength axis of a light reception signal is corrected by the light reception shift correction. Consequently, it is possible to compensate for fluctuation in a measurement result due to a shift on the wavelength axis of the light reception waveform W0 involved in a temperature change. Further, deviation of a scale on the wavelength axis of the light reception signal is corrected by the light reception waveform scale correction. Consequently, it is possible to compensate for fluctuation in a measurement result due to deviation of a scale on the wavelength axis of the light reception waveform W0 involved in the temperature change.

In this embodiment, the processing device 100 and the measurement head 200 are separately provided and optically connected by the light guide section 300. Therefore, it is easy to use the measurement head 200 including the lens unit 220 that causes an appropriate chromatic aberration according to the shape, the disposition, or the like of the measurement object S or the lens unit 220 having an appropriate focal length. Consequently, it is possible to more easily measure the displacement of the measurement object S.

Since the light guide section 300 includes the optical fibers, it is possible to dispose the processing device 100 and the measurement head 200 separately from each other. A mechanically-driven component is not provided in the measurement head 200. A heat generation source is absent in the measurement head 200. Therefore, it is possible to dispose the measurement head 200 in various environments. As explained below, when an exposed portion of the measurement head 200 is formed of glass, it is possible to dispose the measurement head 200 in more various environments.

When the laser diode is used as the light source 121, the light guide section 300 desirably includes an optical fiber. For example, when the phosphor 122 is excited by laser light emitted by the light source 121 as shown in FIG. 4 to generate light having a plurality of wavelengths, it is possible to efficiently extract light generated by using the optical fiber. It is possible to efficiently supply the extracted light to the measurement head 200 by using the optical fiber.

Further, in the measurement head 200, the lens unit 220 and the optical fiber 314 are housed in the housing 210. Therefore, it is possible to fix a positional relation between the lens unit 220 and the optical fiber 314 in the housing 210. In this case, the user does not need to adjust the positional relation between the lens unit 220 and the optical fiber 314. Therefore, it is possible to more easily measure the displacement of the measurement object S.

In this embodiment, the distal end portion of the optical fiber 314 functions as the pinhole. By using the clad 310b of the optical fiber 314 as the light blocking section and using the core 310a as the pinhole in this way, it is possible to realize a confocal optical system with a simple configuration. On the other hand, when a loss of light can be allowed, a light blocking member obtained by providing a pinhole in a plate having a light blocking property may be disposed at the end portion of the optical fiber 314 on the measurement head 200 side.

(8) Modification of the Lens Unit

In this embodiment, the lens unit 220 includes the refraction lens 221 and the diffraction lens 222. However, the present invention is not limited to this. The lens unit 220 may not include one or both of the refraction lens 221 and the diffraction lens 222. FIGS. 24A to 24D are diagrams showing first to fourth modifications of the lens unit 220.

Figure 24A:
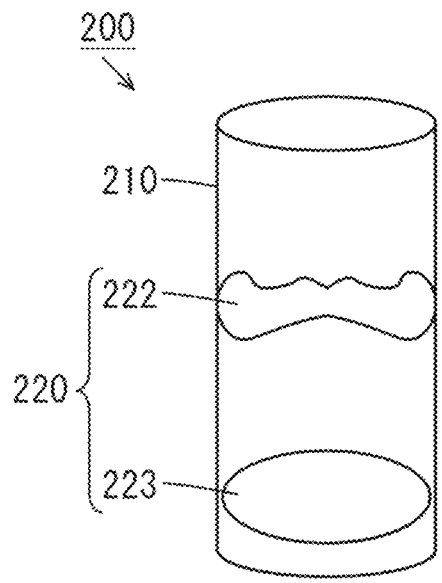
FIGS. 24A to 24D are diagrams showing first to fourth modifications of a lens unit.
Figure 24B:
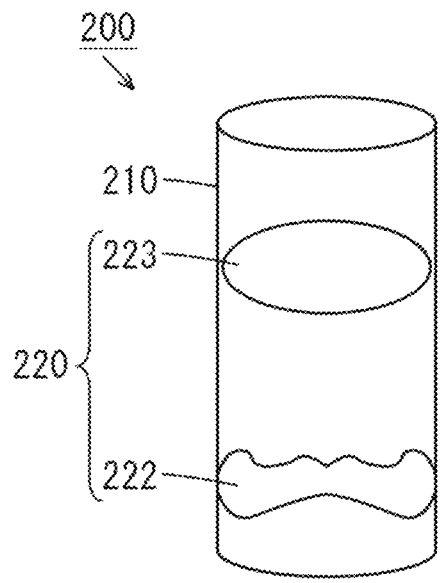

As shown in FIG. 24A, the lens unit 220 in the first modification includes the diffraction lens 222 and the objective lens 223 without including the refraction lens 221 shown in FIG. 1. As shown in FIG. 24B, as in the first modification, the lens unit 220 in the second modification includes the diffraction lens 222 and the objective lens 223 without including the refraction lens 221 shown in FIG. 1. In the second modification, the diffraction lens 222 and the objective lens 223 are disposed oppositely to the positions of the diffraction lens 222 and the objective lens 223 in the first modification.

Figure 24C:
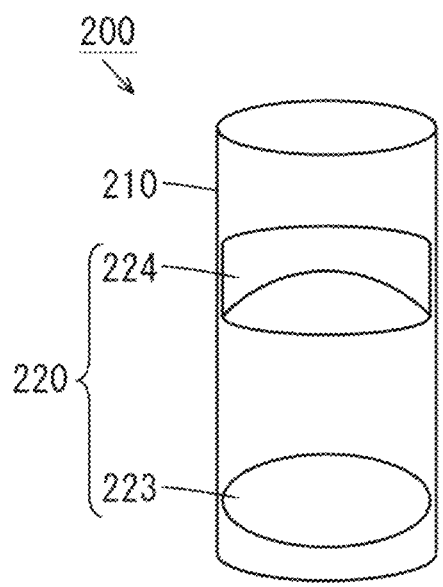
Figure 24D:
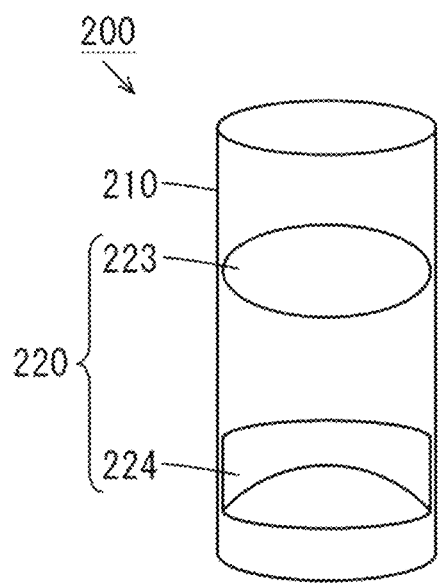

As shown in FIG. 24C, the lens unit 220 in the third modification includes a tablet lens 224 instead of the diffraction lens 222 in the first modification. As shown in FIG. 24D, the lens unit 220 in the fourth modification includes the tablet lens 224 instead of the diffraction lens 222 in the second modification. In this way, the lens unit 220 may be configured by, for example, a diffraction lens, a tablet lens, a GRIN (graded index) lens, or a prism or a combination of these lenses. With these configurations of the lens unit 220, it is possible to cause a chromatic aberration along the optical axis direction in light emitted by the light projecting section 120. It is possible to converge the light having the chromatic aberration and irradiate the light on the measurement object S.

The lens may be a glass lens, may be a resin lens, or may be a glass lens, on the surface of which resin is coated. The glass lens has high heat resistance. The resin lens can be inexpensively manufactured. The glass lens coated with the resin can be relatively inexpensively manufactured and has relatively high heat resistance.

A lens that can be set closest to the measurement object S in the lens unit 220 is disposed in, for example, a state in which the lens is exposed to the outside. The lens exposed to the outside in this way is desirably formed of glass. The measurement head 200 is disposed in an environment in which water, oil, or the like is present in a manufacturing line of a factory or the like. When an optical system of a portion exposed to the outside of the measurement head 200 is formed of glass, it is possible to improve oil resistance, water resistance, and contamination resistance of the measurement head 200.

Because of the same reason as in the example explained above, when a portion exposed to the outside is present in the lens unit 220, the exposed portion is desirably formed of glass. Note that, if the entire lens unit 220 can be blocked from the atmosphere on the outside of the measurement head 200, the refraction lens 221, the diffraction lens 222, the objective lens 223, or the tablet lens 224 may be formed of resin rather than glass. For example, in the example shown in FIGS. 24A to 24D, cover glass may be provided on the lower side (the measurement object S side) of the lens unit 220 in a state in which the lens unit 220 is disposed in the housing 210.

(9) Modifications of the Light Projecting Section

Figure 25:
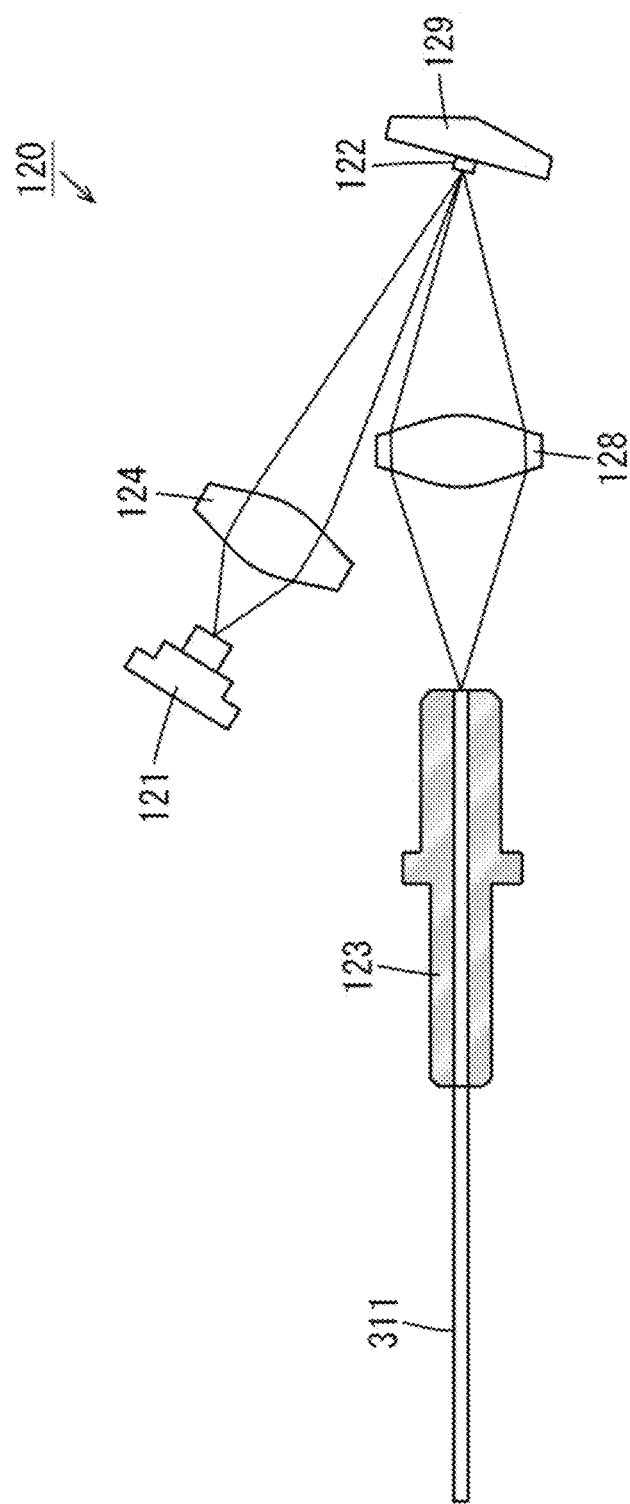
FIG. 25 is a diagram showing a modification of the light projecting section.

In this embodiment, the optical axis of light emitted from the light source 121 and the center axis of the ferrule 123 are disposed on a straight line. However, the present invention is not limited to this. FIG. 25 is a diagram showing a modification of the light projecting section 120. As shown in FIG. 25, the light projecting section 120 in the modification includes the light source 121, the phosphor 122, the ferrule 123, lenses 124 and 128, and a reflection member 129. The lens 124 is disposed between the light source 121 and the reflection member 129. The lens 128 is disposed between the reflection member 129 and the ferrule 123. The phosphor 122 is applied to a reflection surface of the reflection member 129.

Light emitted by the light source 121 passes through the lens 124 to thereby be condensed on the phosphor 122 applied to the reflection member 129 as excitation light. The phosphor 122 absorbs the excitation light and discharges fluorescent light. The excitation light transmitted through the phosphor 122 without being absorbed by the phosphor 122 and the fluorescent light discharged from the phosphor 122 are mixed, whereby light in a wide wavelength band is generated. The generated light is reflected on the reflection surface of the reflection member 129 to thereby be guided to the ferrule 123 through the lens 128. Consequently, the light is input to the optical fiber 311. In this configuration, flexibility of disposition of optical elements increases. Therefore, it is easy to reduce the light projecting section 120 in size.

In order to increase the intensity of light generated by the light projecting section 120, it is desirable to increase a light amount of the light emitted by the light source 121. On the other hand, when the light amount of the light emitted from the light source 121 is increased, heat generation of the phosphor 122 increases. Therefore, reflection efficiency of the reflection member 129 decreases and the discharge of the fluorescent light from the phosphor 122 is easily saturated. Therefore, the reflection member 129 may be configured to rotatable or movable. Consequently, the phosphor 122 is cooled and the heat generation can be reduced. As a result, it is possible to further increase the intensity of the light generated by the light projecting section 120.

(10) Modifications of the Spectral Section

Figure 26:
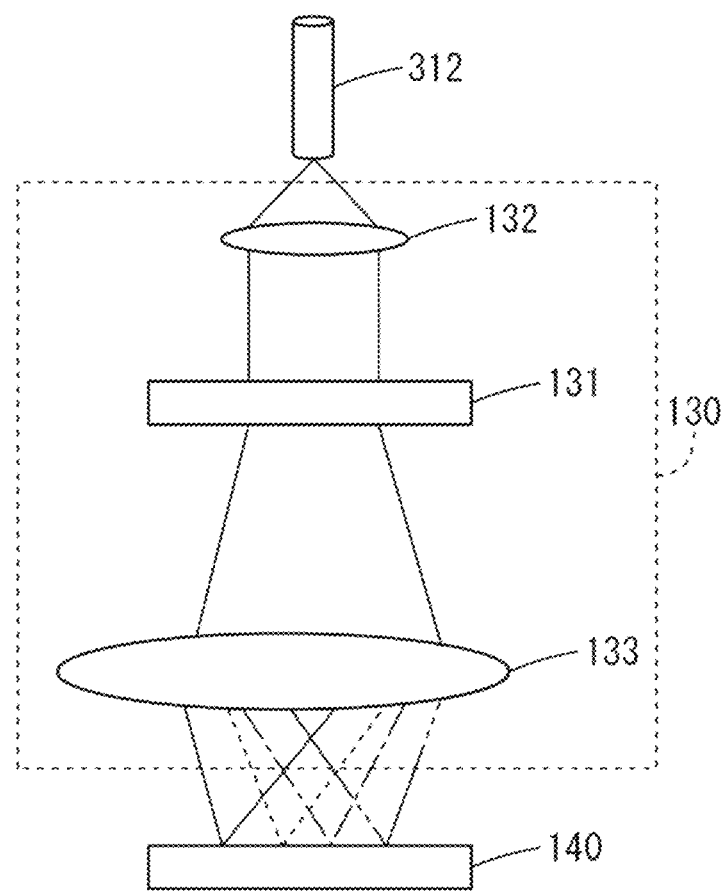
FIG. 26 is a diagram showing a modification of a spectral section.

In this embodiment, the diffraction grating 131 of the spectral section 130 is a reflection type. However, the present invention is not limited to this. FIG. 26 is a diagram showing a modification of the spectral section 130. As shown in FIG. 26, in the modification of the spectral section 130, the diffraction grating 131 is a transmission type. Light made incident on the diffraction grating 131 is spectrally dispersed to transmit at an angle different for each wavelength. The light spectrally dispersed by the diffraction grating 131 passes through the lens 133 to thereby be focused on the position of the pixel of the light receiving section 140 different for each wavelength.

In the spectral section 130 in this example, zero-th order light traveling straight and passing through the diffraction grating 131 is sometimes generated. When the zero-th order light is received by the light receiving section 140, a peak of a light reception waveform corresponding to the zero-th order light can be used for the light reception waveform shift correction and the light reception waveform scale correction.

[2] Second Embodiment (1) Basic Configuration of a Confocal Displacement Sensor

Figure 27:
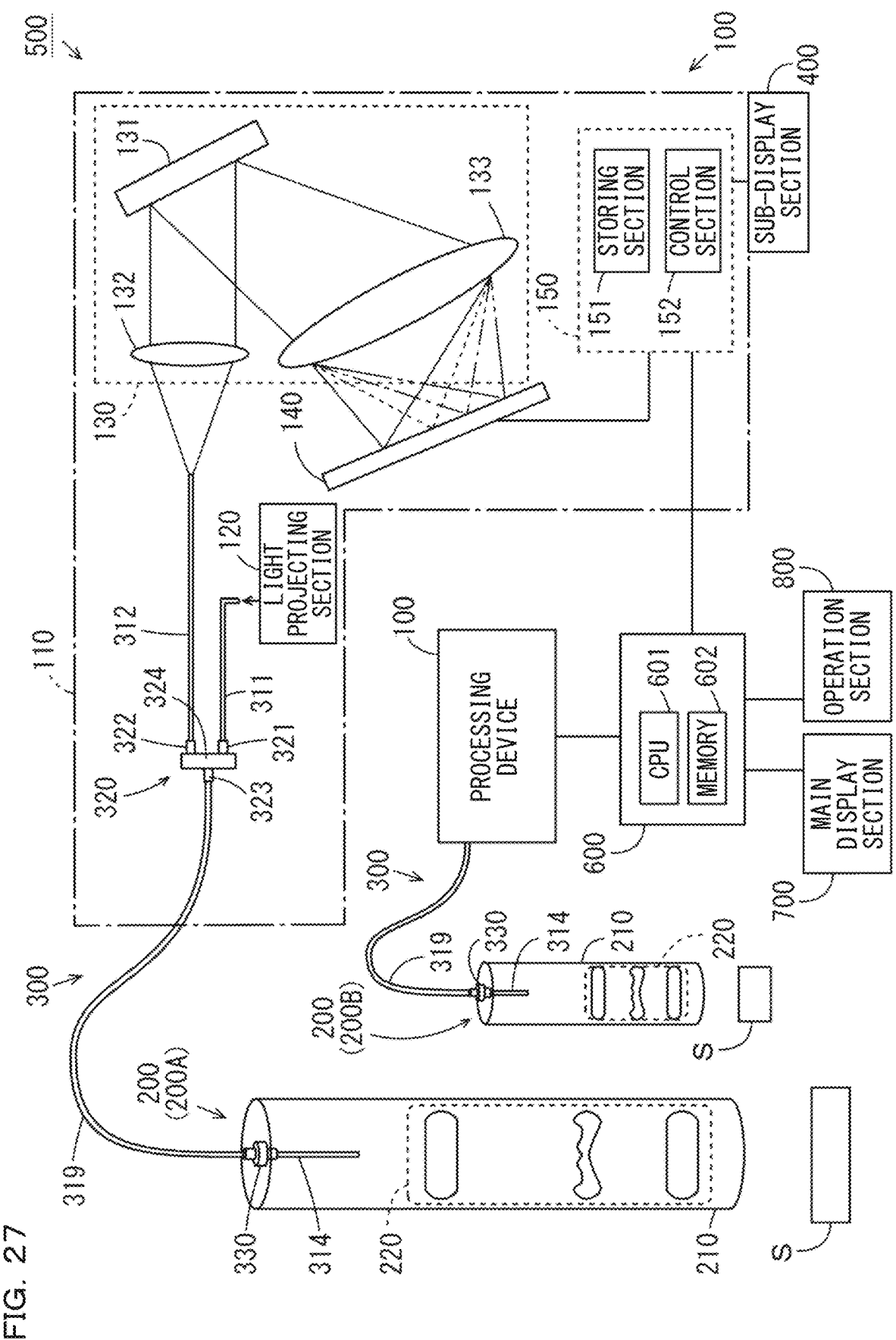
FIG. 27 is a schematic diagram showing the configuration of a confocal displacement sensor according to a second embodiment.

Concerning a confocal displacement sensor according to a second embodiment of the present invention, differences from the confocal displacement sensor 500 according to the first embodiment are explained. FIG. 27 is a schematic diagram showing the configuration of the confocal displacement sensor according to the second embodiment. As shown in FIG. 27, the confocal displacement sensor 500 according to this embodiment includes two processing devices 100, two measurement heads 200, two light guide sections 300, the PC 600, the main display section 700, and the operation section 800. The two processing devices 100 have the same configuration as the configuration of the processing device 100 according to the first embodiment. The two measurement heads 200 have the same configuration as the configuration of the measurement head 200 according to the first embodiment. The two light guide sections 300 have the same configuration as the configuration of the light guide section 300 according to the first embodiment. In this embodiment, one PC 600 is connected to the two processing devices 100.

In the following explanation, when the two measurement heads 200 are distinguished, one measurement head 200 is referred to as first measurement head 200A and the other measurement head 200 is referred to as second measurement head 200B.

In the confocal displacement sensor 500 having the configuration explained above, light having a plurality of wavelengths is emitted from each of the light projecting sections 120 of the two processing devices 100. Lights emitted by the light projecting sections 120 are transmitted to the measurement heads 200 corresponding to the light projecting sections 120 through the light guide sections 300 corresponding to the light projecting sections 120 and irradiated on the measurement object S. The lights reflected while focusing on the surface of the measurement object S pass through the optical fibers 314 of the measurement heads 200 that irradiate the lights. The lights passed through the optical fibers 314 of the measurement heads 200 are guided to the spectral sections 130 of the processing devices 100 corresponding to the measurement heads 200 through the light guide sections 300 corresponding to the measurement heads 200 and spectrally dispersed. The spectrally dispersed lights are received by the light receiving sections 140 corresponding to the spectral sections 130. In this way, light reception signals corresponding to the two measurement heads 200 are respectively output from the light receiving sections 140 of the two processing devices 100. The control sections 152 of the processing devices 100 acquire the light reception signals output from the light receiving sections 140, perform the correction explained above on the light reception signals, and measure displacement of the measurement object S. The control sections 152 give the light reception signals after the correction to one PC 600.

The CPU 601 of the PC 600 performs displacement measurement processing using two light reception signals acquired from the control sections 152 of the two processing devices 100 to thereby measure displacements of two portions of the measurement object S on which the lights are irradiated by the two measurement heads 200. In this case, the CPU 601 may perform, in parallel, the displacement measurement processing using a light reception signal corresponding to the first measurement head 200A and the displacement measurement processing using a light reception signal corresponding to the second measurement head 200B. Alternatively, the CPU 601 may alternately perform the displacement measurement processing in which the light reception signal corresponding to the first measurement head 200A is used and the displacement measurement processing in which the light reception signal corresponding to the second measurement head 200B is used.

(2) Use Example Peculiar to the Confocal Displacement Sensor According to the Second Embodiment With the confocal displacement sensor 500 according to this embodiment, it is possible to measure displacements of a plurality of portions of one measurement object S using the two measurement heads 200. In this case, the confocal displacement sensor 500 shown in FIG. 25 can also be used to, for example, measure the thickness of the measurement object S.

Figure 28:
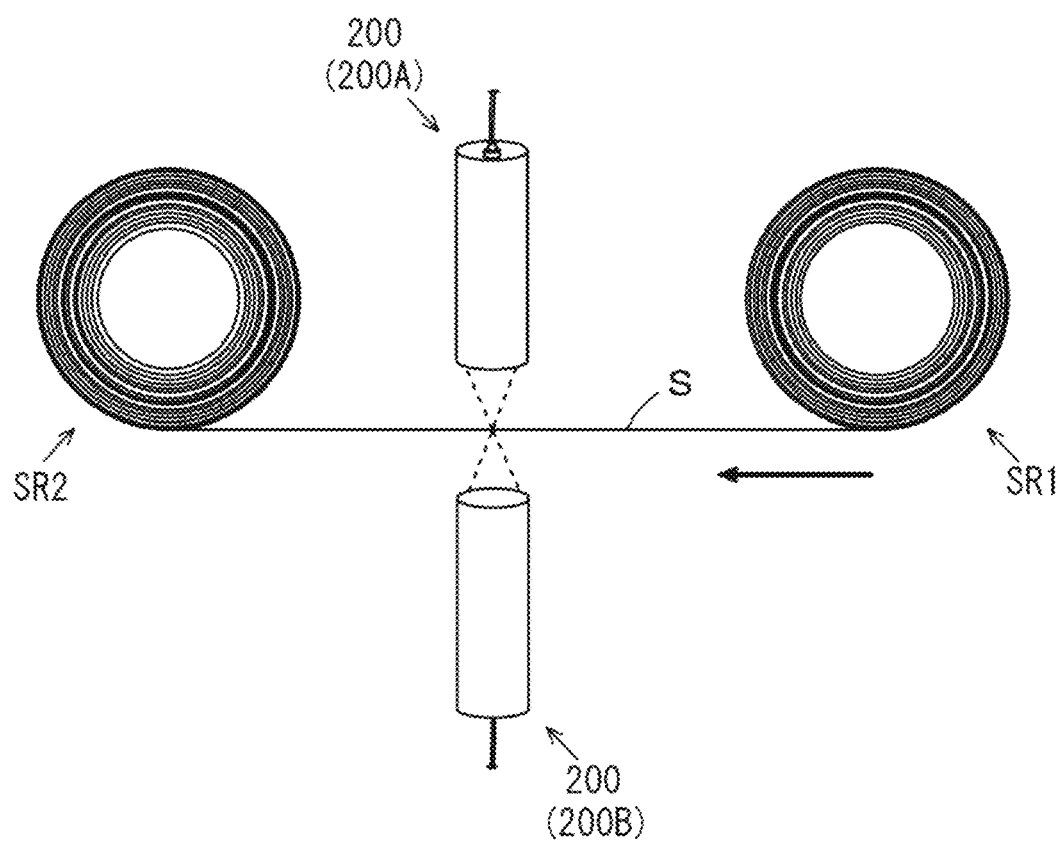
FIG. 28 is a diagram showing an example of thickness measurement of a measurement object by the confocal displacement sensor according to the second embodiment.

FIG. 28 is a diagram showing an example of thickness measurement of the measurement object S by the confocal displacement sensor 500 according to the second embodiment. In this example, the confocal displacement sensor 500 is used to measure the thickness of a sheet-like measurement object S.

As indicated by an arrow of a thick solid line in FIG. 28, for example, the measurement object S is let out from a first roll SR1 on which the measurement object S is wound. The measurement object S let out from the first roll SR1 is wound by a second roll SR2. In this state, the two measurement heads 200 are disposed above and below the measurement object S to be opposed to each other across a portion of the measurement object S located between the first and second rolls SR1 and SR2.

When a positional relation between the two measurement heads 200 is known, it is possible to measure the thickness of the measurement object S on the basis of displacements of the upper surface and the lower surface of the measurement object S respectively measured by the two measurement heads 200. However, depending on a disposition state of the two measurement heads 200, the thickness of a desired portion of the measurement object S cannot be accurately measured.

Figure 29A:
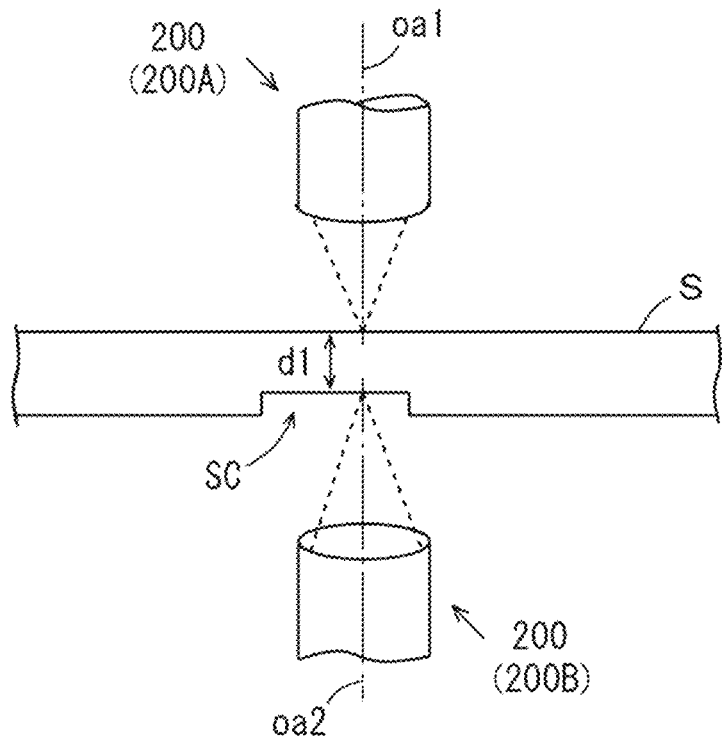
FIGS. 29A and 29B are diagrams showing a positional relation between the measurement object and two measurement heads shown in FIG. 28.
Figure 29B:
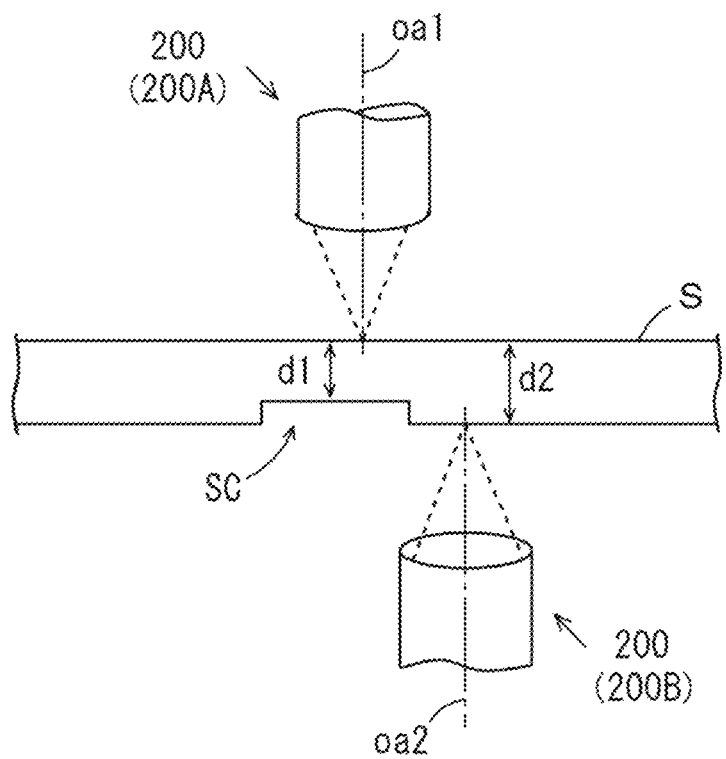

FIGS. 29A and 29B are diagrams showing a positional relation between the measurement object S and the two measurement heads 200 shown in FIG. 28. In this example, it is assumed that thickness d1 of a portion of a hollow SC of the measurement object S having the hollow SC in a part of the lower surface is measured.

In an example shown in FIG. 29A, an optical axis oa1 of the first measurement head 200A and an optical axis oa2 of the second measurement head 200B coincide with each other. That is, the optical axis oa1 of the first measurement head 200A and the optical axis oa2 of the second measurement head 200B are located on a common axis. In this case, it is possible to accurately measure the thickness d1 of the portion of the hollow SC of the measurement object S.

On the other hand, in an example shown in FIG. 29B, the optical axis oa1 of the first measurement head 200A and the optical axis oa2 of the second measurement head 200B do not coincide with each other. In this example, the optical axis oa1 of the first measurement head 200A and the optical axis oa2 of the second measurement head 200B are disposed in parallel to each other. However, the two optical axes oa1 and oa2 are not present on the same axis. Consequently, light emitted from the first measurement head 200A is irradiated on the upper surface of the measurement object S overlapping the hollow SC. Light emitted from the second measurement head 200B is irradiated on the lower surface of the measurement object S in a position deviating from the hollow SC. In this case, the thickness d1 of the portion of the hollow SC of the measurement object S is not measured. Thickness d2 of the portion deviating from the hollow SC of the measurement object S is measured by mistake.

When the two measurement heads 200 are disposed to be opposed to each other and the thickness of the measurement object S disposed between the two measurement heads 200 is measured as explained above, the optical axes oa1 and oa2 of the two measurement heads 200 need to be matched. However, it is difficult for an unskilled user to adjust the position and the posture of the measurement heads 200 such that the optical axes oa1 and oa2 of the two measurement heads 200 coincide with each other.

Therefore, in the confocal displacement sensor 500 according to this embodiment, a function for confirming whether the optical axes oa1 and oa2 of the two measurement heads 200 coincide with each other when disposing the two measurement heads 200 to be opposed to each other (hereinafter referred to as opposed disposition confirmation function) is provided.

Figure 30:
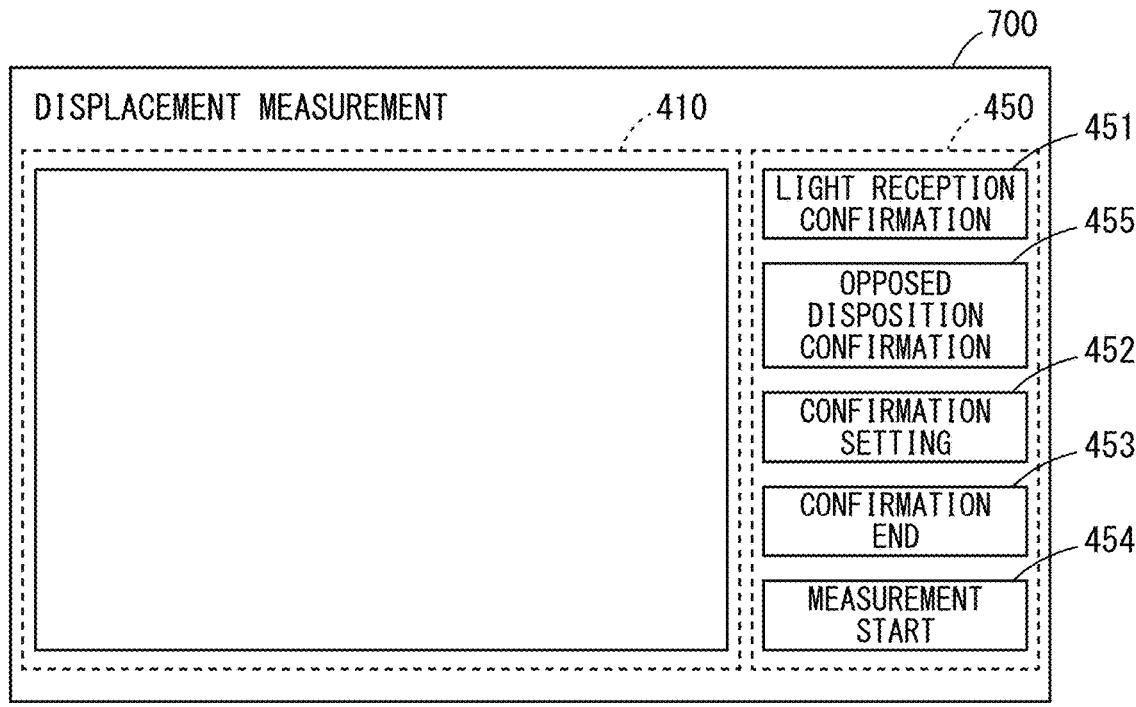
FIG. 30 is a diagram showing a display example of a main display section in an initial state of the confocal displacement sensor according to the second embodiment.

FIG. 30 is a diagram showing a display example of the main display section 700 in an initial state of the confocal displacement sensor 500 according to the second embodiment. In the display example shown in FIG. 30, in addition to the display example shown in FIG. 11 according to the first embodiment, an opposed disposition confirmation button 455 is displayed in the second display region 450. A user can use the opposed disposition confirmation function by operating the opposed disposition confirmation button 455 using the operation section 800 shown in FIG. 27.

When the measurement object S is absent between the two measurement heads 200 disposed such that the lens units 220 are opposed to each other, light emitted from one measurement head 200 is made incident on the optical fiber 314 of the other measurement head 200. Light emitted from the other measurement head 200 is made incident on the optical fiber 314 of one measurement head 200.

The intensity of the lights made incident on the respective optical fibers 314 of the two measurement heads 200 increases as the optical axes oa1 and oa2 of the two measurement heads 200 are closer to a coincident state and reaches the maximum when the optical axes oa1 and oa2 coincide with each other. On the other hand, the intensity of the lights made incident on the respective optical fibers 314 of the two measurement heads 200 decreases as deviation of the optical axes oa1 and oa2 increases. Therefore, the opposed disposition confirmation function is realized by the CPU 601 performing processing basically the same as the displacement measurement processing concerning the two measurement heads 200.

Specifically, the CPU 601 generates change information (hereinafter referred to as first change information) concerning a light reception signal of the light emitted from the first measurement head 200A and guided to the light receiving section 140 from the optical fiber 314 of the second measurement head 200B. The CPU 601 generates change information (hereinafter referred to as second change information) concerning a light reception signal of light emitted from the second measurement head 200B and guided to the light receiving section 140 from the optical fiber 314 of the first measurement head 200A. The CPU 601 displays the first change information and the second change information generated in this way on the main display section 700.

Figure 31:
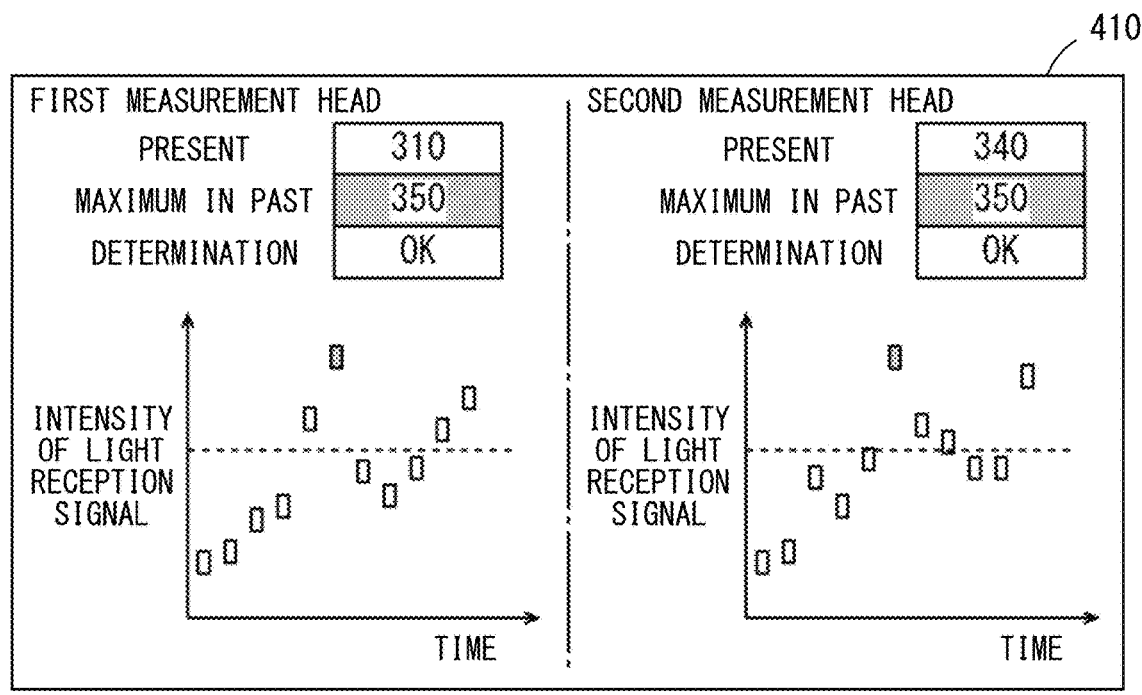
FIG. 31 is a diagram showing a display information of first change information and second change information displayed in a first display region shown in FIG. 30 by an opposed disposition confirmation function.

FIG. 31 is a diagram showing a display example of the first change information and the second change information displayed in the first display region 410 shown in FIG. 30 by the opposed disposition confirmation function. In the example shown in FIG. 31, the first change information and the second change information are displayed as in the example shown in FIG. 15 in the first embodiment. In this case, the user can perform, on the basis of the first change information and the second change information displayed on the main display section 700, positioning of the two measurement heads 200 such that the optical axes oa1 and oa2 coincide with each other. Note that, in the first display region 410, the first change information and the second change information may be displayed in all the forms shown in FIGS. 15 to 20.

The CPU 601 may control the arithmetic processing sections 150 of the two processing devices 100 such that the first measurement head 200A and the second measurement head 200B are synchronized. For example, the CPU 601 may give a synchronization signal to the two arithmetic processing sections 150 as a trigger for causing the light projecting sections 120 to emit lights. In this case, for example, the control sections 152 of the two processing devices 100 cause the light sources 121 (FIG. 4) of the two light projecting sections 120 to simultaneously emit lights in time series. Consequently, the CPU 601 simultaneously acquires the light reception signal for generating the first change information and the light reception signal for generating the second change information. Therefore, acquisition times of the light reception signals respectively corresponding to the two measurement heads 200 are reduced.

When measuring the thickness of the measurement object S as shown in FIG. 28, the CPU 601 desirably synchronizes light emission timings of the two light projecting sections 120 as in the example explained above. Consequently, it is possible to simultaneously measure upward and downward displacements of the measurement object S. As a result, it is possible to more accurately measure the thickness of the measurement object S.

Note that, contrary to the example explained above, for example, by alternately causing the light sources 121 (FIG. 4) of the two light projecting sections 120 to emit lights in time series, the control section 152 may alternately acquire the light reception signal for generating the first change information and the light reception signal for generating the second change information. Consequently, interference of lights due to simultaneous emission of lights from the two measurement heads 200 is prevented.

Incidentally, the intensity of light guided to the light receiving section 140 from one measurement head 200 through the other measurement head 200 in a state in which the optical axes oa1 and oa2 of the two measurement heads 200 coincide with each other is considered to be large compared with the intensity of light guided to the light receiving section 140 through one measurement head 200 by reflecting while focusing on the measurement object S. Therefore, the control section 152 may set an exposure time of the light receiving section 140 when generating the first change information and the second change information with the opposed disposition confirmation function short compared with an exposure time when measuring the displacement of the measurement object S on the basis of the light reflected from the measurement object S. Alternatively, the control section 152 may adjust a light amount of light generated in the light projecting section 120 to be smaller with respect to a light amount of the light generated when measuring the displacement of the measurement object S. Consequently, it is possible to acquire a light reception signal at appropriate intensity.

(3) Effects

The confocal displacement sensor 500 according to this embodiment includes the two processing devices 100, the two measurement heads 200, and the two light guide sections 300. Consequently, it is possible to measure displacements of two portions of the measurement object S on which lights are irradiated by the two measurement heads 200.

The confocal displacement sensor 500 according to this embodiment has the opposed disposition confirmation function for confirming whether the optical axes oa1 and oa2 of the two measurement heads 200 coincide with each other when the two measurement heads 200 are disposed to be opposed to each other. In the opposed disposition confirmation function, the CPU 601 generates the first change information concerning the light reception signal of the light emitted from the first measurement head 200A and guided to the light receiving section 140 from the optical fiber 314 of the second measurement head 200B. The control section 152 generates the second change information concerning the light reception signal of the light emitted from the second measurement head 200B and guided to the light receiving section 140 from the optical fiber 314 of the first measurement heads 200A. Further, the CPU 601 displays the generated first change information and the generated second change information on the main display section 700.

In this way, the change information concerning the light reception signal of the light passing through the optical fiber 314 of the other measurement head 200 from one measurement head 200 is displayed on the main display section 700. Consequently, the user can easily match the optical axes oa1 and oa2 of the two measurement heads 200 in a state in which the two measurement heads 200 are disposed to be opposed to each other. In this state, by disposing the measurement object S between the two measurement heads 200, it is possible to accurately measure the thickness of the measurement object S.

[4] Other Embodiments (1) In the embodiments explained above, the CPU 601 measures displacement of the outer surface of the measurement object S on the basis of a light reception signal of light reflected while focusing on the outer surface of the measurement object S serving as the surface of the measurement object S. However, present invention is not limited to this. The CPU 601 may measure displacement of the inner surface of the measurement object S together with the displacement of the outer surface of the measurement object S.

Figure 32:
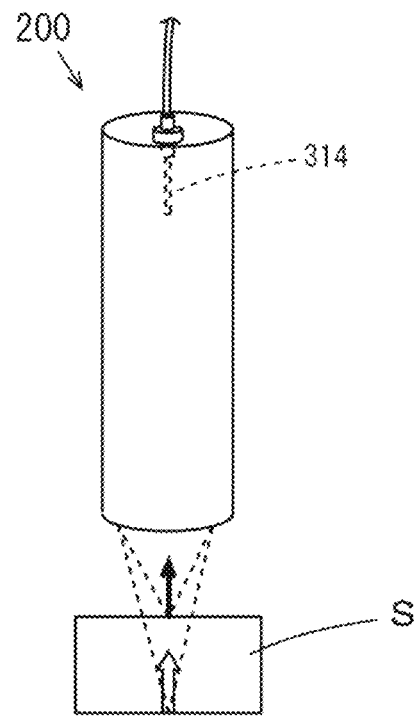
FIG. 32 is a diagram showing an example in which displacements of an outer surface and an inner surface are measured concerning a transparent measurement object.

FIG. 32 is a diagram showing an example in which displacements of the outer surface and the inner surface are measured concerning a transparent measurement object S. As indicated by a solid line in FIG. 32, when the measurement object S is a transparent body, a part of light irradiated on the measurement object S from the measurement head 200 is reflected while focusing on the outer surface (the upper surface) of the measurement object S and input to the core 310a (FIG. 2) of the optical fiber 314. As indicated by a white solid line in FIG. 32, a part of light not reflected on the outer surface of the measurement object S in the light irradiated on the measurement object S from the measurement head 200 passes through the inside of the measurement object S and is reflected while focusing on the inner surface (the lower surface) of the measurement object S and input to the core 310a (FIG. 2) of the optical fiber 314.

Figure 33:
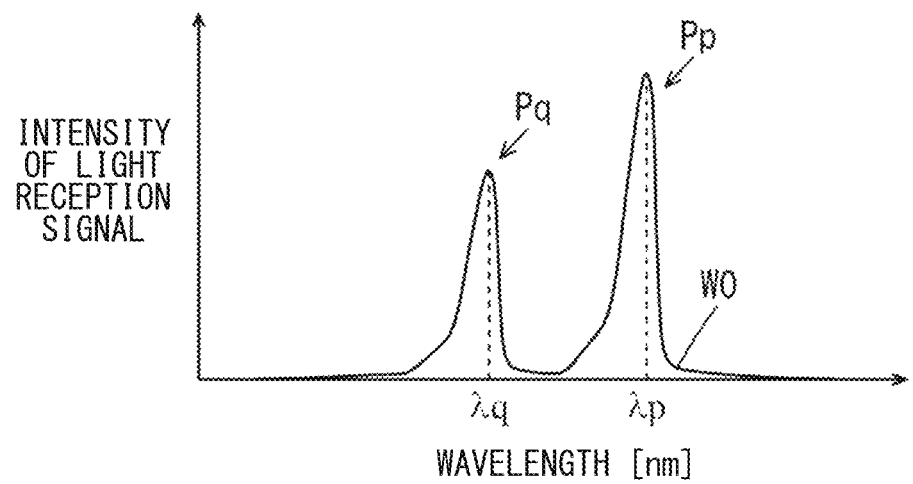
FIG. 33 is a diagram showing a light reception waveform acquired by irradiating light on the measurement object shown in FIG. 32.

FIG. 33 is a diagram showing a light reception waveform acquired by irradiating light on the measurement object S shown in FIG. 32. The horizontal axis of FIG. 33 indicates a wavelength and the vertical axis indicates the intensity of the light reception signal. As shown in FIG. 33, the light reception waveform W0 in this example includes a peak Pp corresponding to the outer surface of the measurement object S and a peak Pq corresponding to the inner surface of the measurement object S.

In this case, a peak wavelength $\lambda p$ of one peak Pp corresponds to the distance from the reference position RP (FIG. 2) of the measurement head 200 to the outer surface of the measurement object S. A peak wavelength $\lambda q$ of the other peak Pq corresponds to the distance from the reference position RP (FIG. 2) of the measurement head 200 to the inner surface of the measurement object S.

The CPU 601 may measure the displacement of the outer surface and the inner surface of the measurement object S on the basis of the two peak wavelengths $\lambda p$ and $\lambda q$. The CPU 601 may calculate the thickness of the measurement object S on the basis of a difference between the two peak wavelengths $\lambda p$ and $\lambda q$.

In this case, during the light reception confirmation processing, the CPU 601 may generate change information concerning each of the two peaks Pp and Pq and cause the main display section 700 to display generated two kinds of change information.

Display of the change information is not limited to this example. When a light reception signal includes a plurality of peaks, during the light reception confirmation processing, the CPU 601 may generate change information concerning the highest peak among the plurality of peaks and cause the main display section 700 to display generated one kind of change information. Alternatively, the CPU 601 may generate change information concerning a peak having a waveform most similar to a predetermined waveform among the plurality of peaks and cause the main display section 700 to display generated one kind of change information.

(2) In the embodiments, the change from the peak value of the light reception signal acquired at the point in time before the present point in time to the peak value of the light reception signal acquired at the present point in time is generated as change information and the generated change information is displayed in the main display section 700. The present invention is not limited to this. Instead of the change information, a change from an integrated value of the light reception signal acquired at the point in time before the present point in time to an integrated value of the light reception signal acquired at the present point in time may be generated as change information by the control section 152. The generated change information may be displayed on the main display section 700.

The integrated value of the light reception signal increases as a value of the light reception signal increases. The integrated value of the light reception signal decreases as the value of the light reception signal decreases. Therefore, by visually recognizing the change information, the user can appropriately adjust the position and the posture of the measurement head 200 such that a higher integrated value can be obtained while recognizing a change over time of the integrated value of the light reception signal. As a result, the user is capable of easily and accurately measuring the displacement of the measurement object S. Note that, for example, as indicated by the example shown in FIG. 33, the change information obtained using the integrated value can be effectively used when a plurality of displacements are measured using a plurality of peaks.

(3) In the embodiments, the propriety determination result of the position and the posture of the measurement head 200 is displayed on the main display section 700 together with the change information when the light reception confirmation processing is performed. However, the present invention is not limited to this.

When the light reception confirmation processing is performed, for example, a threshold of propriety determination may be displayed as a numerical value on the main display section 700 together with the change information and the propriety determination result. In this case, the user can adjust the position and the posture of the measurement head 200 on the basis of the threshold displayed on the main display section 700.

When the light reception confirmation processing is performed, an indicator indicating whether an acquired light reception waveform has a peak may be displayed on the main display section 700 together with the propriety determination result. Further, when the present peak value is equal to or higher than the largest peak value of a light reception signal in the past, an indicator indicating that the present peak value is the largest may be displayed on the main display section 700. Consequently, convenience in adjusting the position and the posture of the measurement head 200 is improved.

Note that the propriety determination result of the position and the posture of the measurement head 200 may be presented to the user by a method other than the display on the main display section 700. For example, a light emitting section may be provided in the measurement head 200. The light emitting section may be lit when the position and the posture of the measurement head 200 are appropriate and may be extinguished when the position and the posture of the measurement head 200 are inappropriate. In this case, the user is capable of adjusting the position and the posture of the measurement head 200 without visually recognizing the main display section 700.

(4) In the embodiments, in the light reception confirmation processing, the CPU 601 determines the propriety of the position and the posture of the measurement head 200 on the basis of whether the peak value of the light reception signal is higher than the certain threshold. However, the present invention is not limited to this. The CPU 601 may determine the propriety of the position and the posture of the measurement head 200 on the basis of whether the present peak value is higher than a value of a predetermined ratio (hereinafter referred to as threshold ratio) of the maximum peak value in the past. In this case, the user may be able to set the threshold ratio.

Figure 34:
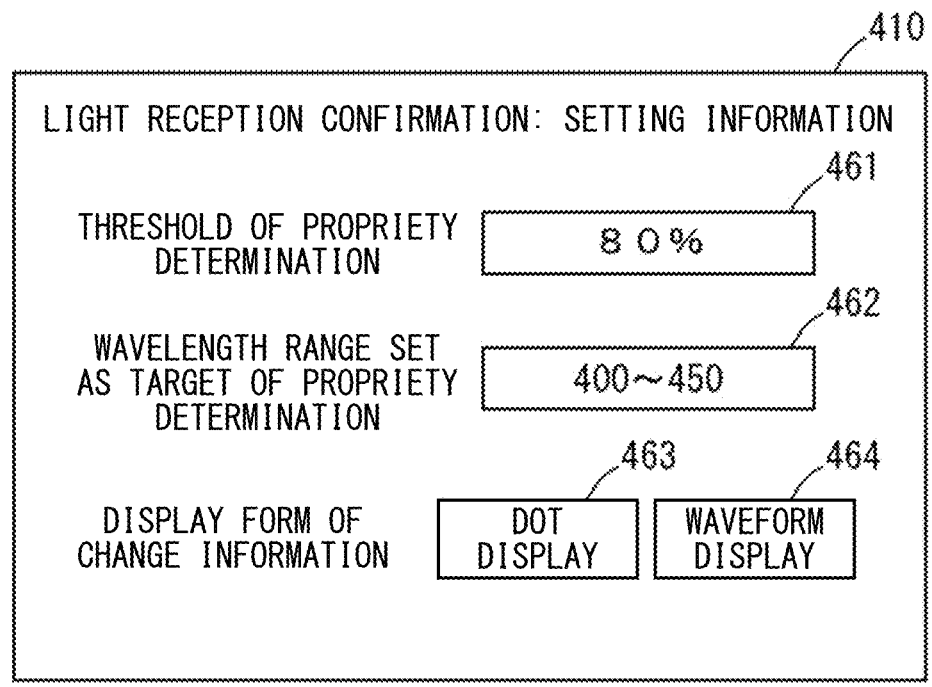
FIG. 34 is a diagram showing another example of an input screen for setting information displayed in the first display region shown in FIG. 11.

FIG. 34 is a diagram showing another example of an input screen of setting information displayed in the first display region 410 shown in FIG. 11. In the example shown in FIG. 34, an uppermost input field 461 is used by the user to designate the threshold ratio. The user inputs a desired ratio to the input field 461, whereby the input ratio is set as the threshold ratio.

Figure 35:
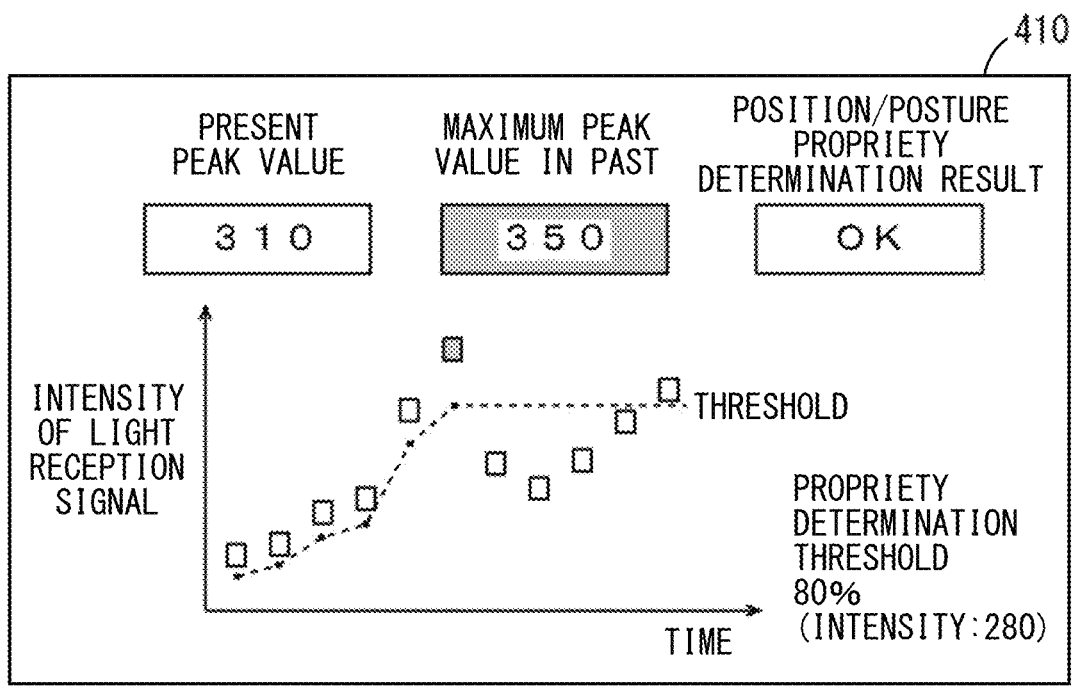
FIG. 35 is a diagram showing an example of change information displayed in the first display region shown in FIG. 11 by the light reception confirmation processing in a state in which a threshold ratio is set by a user.

FIG. 35 is a diagram showing an example of change information displayed in the first display region 410 shown in FIG. 11 by the light reception confirmation processing in a state in which the threshold ratio is set by the user. In the example shown in FIG. 35, as in the example shown in FIG. 15, a present peak value, a maximum peak value in the past, and a dot plot graph showing a change of peak values of light reception signals from a start of the light reception confirmation processing until the present point in time are displayed. A propriety determination result of the position and the posture of the measurement head 200 is also displayed.

Further, in this example, the threshold ratio set by the user is displayed in percentage. A value of the threshold ratio with respect to the maximum peak value in the past at the present point in time is displayed as a value of the intensity of a light reception signal. In the dot plot graph shown in FIG. 35, the threshold of the propriety determination, which changes every time the maximum peak value in the past is updated, is indicated by a dotted line.

(5) In the display examples shown in FIGS. 15 to 20 in the embodiment explained above, a reset button for deleting, from the memory 602, peak values and light reception waveforms of light reception signals stored from the start of the light reception confirmation processing until the present point in time may be further displayed in the first display region 410. In this case, when an abnormal light reception signal is acquired because of wrong operation of the measurement head 200 or the influence of noise, the user operates the reset button. Consequently, it is possible to prevent change information based on the abnormal light reception signal from being displayed.

(6) In the display examples shown in FIGS. 15 to 20 in the embodiment, the graph concerning the light reception signal is displayed in the first display region 410 as the change information together with the present peak value and the maximum peak value in the past. However, the present invention is not limited to this. As the change information, only the present peak value and the maximum peak value in the past may be displayed. In this case, it is possible to reduce a display area of the change information by the main display section 700. Therefore, it is possible to reduce the main display section 700 in size.

(7) In the embodiments, as indicated by the display examples shown in FIGS. 15 to 20, the change information includes the present peak value and the maximum peak value in the past as parameters indicating the position and the posture of the measurement head 200. However, the present invention is not limited to this. The change information may include, instead of the present peak value and the maximum peak value in the past, evaluation values respectively corresponding to the present peak value and the maximum peak value in the past. In this case, the evaluation values are set to values easily recognized by the user. Consequently, convenience of the confocal displacement sensor 500 is improved.

(8) In the embodiments, the laser diode that emits the light having the single wavelength is used as the light source 121 of the light projecting section 120. However, the present invention is not limited to this. An LED (light emitting diode) that emits light in a wide wavelength band may be used as the light source 121. When an LED that emits white light is used as the light source 121, the phosphor 122 may be provided or may not be provided.

(9) In the embodiments, the light projecting section 120 emits the light having the wavelength of 500 nm to 700 nm. However, the present invention is not limited to this. The light projecting section 120 may emit light in other wavelength bands. For example, the light projecting section 120 may emit light in an infrared region or may emit light in an ultraviolet region.

(10) In the embodiments, the processing device 100 and the measurement head 200 are configured as the separate bodies. However, the present invention is not limited to this. The processing device 100 and the measurement head 200 may be integrally configured.

(11) In the embodiments, the coupling and division of lights are performed using the fiber coupler 320. However, the present invention is not limited to this. The coupling and division of lights may be performed using a plurality of optical fibers 311, 312, and 319, in each of which a plurality of cores 310a are fused into one, without using the fiber coupler 320.

Figure 36:
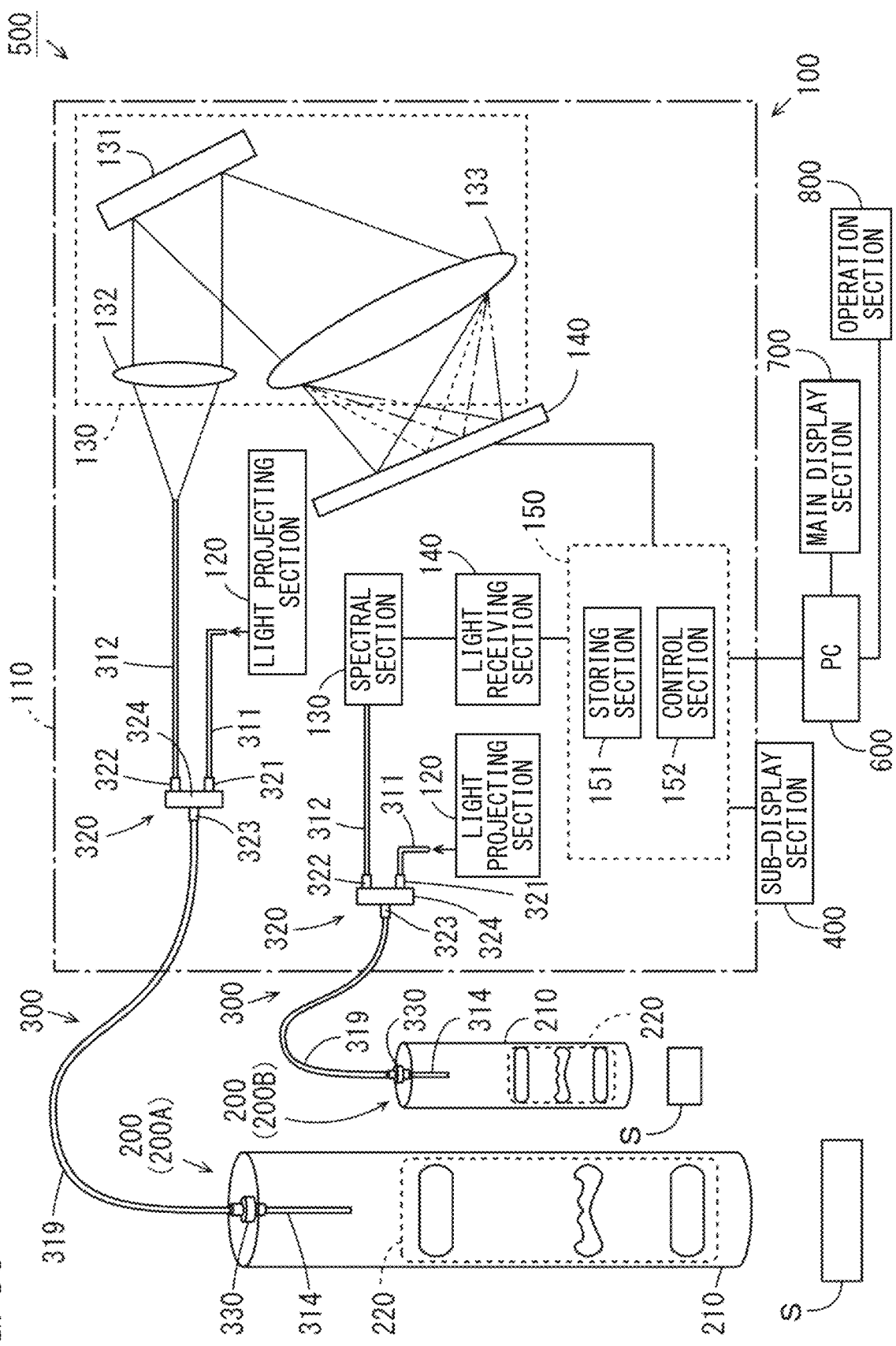
FIG. 36 is a schematic diagram showing the configuration of a confocal displacement sensor according to another embodiment.

(12) In the confocal displacement sensor 500 according to the second embodiment, the opposed disposition confirmation function is realized by including the two processing devices 100, the two measurement heads 200, the two light guide sections 300, the PC 600, the main display section 700, and the operation section 800. However, the present invention is not limited to this. The opposed disposition confirmation function may be realized by the following configuration. FIG. 36 is a schematic diagram showing the configuration of a confocal displacement sensor according to another embodiment. Concerning the confocal displacement sensor 500 shown in FIG. 36, differences from the confocal displacement sensor 500 according to the second embodiment are explained.

As shown in FIG. 36, in the confocal displacement sensor 500 in this example, one processing device 100 is provided with respect to two measurement heads 200. Two light projecting sections 120, two spectral sections 130, and two light receiving sections 140 respectively corresponding to the two measurement heads 200 are housed in the housing 110 of the processing device 100. Further, the confocal displacement sensor 500 shown in FIG. 36 includes two light guide sections 300 respectively corresponding to the two measurement heads 200.

In the confocal displacement sensor 500 shown in FIG. 36, light having a plurality of wavelengths is emitted from each of the two light projecting sections 120. Lights emitted from the light projecting sections 120 are transmitted to the measurement heads 200 corresponding to the light projecting sections 120 through the light guide sections 300 corresponding to the light projecting sections 120 and irradiated on the measurement object S. The lights reflected while focusing on the surface of the measurement object S pass through the optical fibers 314 of the measurement heads 200 that irradiate the lights. The lights passed through the optical fibers 314 of the measurement heads 200 are guided to the spectral sections 130 corresponding to the measurement heads 200 through the light guide sections 300 corresponding to the measurement heads 200 and spectrally dispersed. The spectrally dispersed lights are received by the light receiving sections 140 corresponding to the spectral sections 130. In this way, light reception signals corresponding to the two measurement heads 200 are respectively output from the two light receiving sections 140. The control section 152 of the arithmetic processing sections 150 acquires the two light reception signals output from the two light receiving sections 140.

The control section 152 performs displacement measurement processing using the two light reception signals acquired from the light receiving sections 140 to thereby measure displacements of two portions of the measurement object S on which the lights are irradiated by the two measurement heads 200. The control section 152 gives, to the PC 600, the two light reception signals output from the two light receiving sections 140. Consequently, the CPU 600 is capable of generating the first change information and the second change information as explained in the second embodiment. An opposed disposition confirmation function is realized.

In this example, the two measurement heads 200 are connected to the one processing device 100. However, the present invention is not limited to this. The processing device 100 of the confocal displacement sensor 500 may be configured such that three or four or more measurement heads 200 can be connected to the processing device 100.

(13) In the embodiments, the light reception waveform and the peak value of the light reception signal acquired every time the light reception signal is acquired in the light reception confirmation processing shown in FIG. 22 are stored in the memory 602. However, the present invention is not limited to this. Information stored in the memory 602 may be set according to the change information. For example, when only the present peak value and the maximum peak value in the past are displayed on the main display section 700 as the change information, the light reception waveform may not be stored.

(14) In the second embodiment, the first change information and the second change information corresponding to the first measurement head 200A and the second measurement head 200B are generated by the opposed disposition confirmation function. However, the present invention is not limited to this. In the opposed disposition confirmation function, only one of the first change information and the second change information may be generated. In this case as well, the generated change information is displayed on the main display section 700. Consequently, the user can match the optical axis oa1 of the first measurement head 200A and the optical axis oa2 of the second measurement head 200B.

(15) In the embodiments, the control section 152 of the arithmetic processing section 150 performs correction on the light reception signal acquired from the light receiving section 140 and measures the displacement of the measurement object S and displays a result of the measurement on the sub-display section 400. The control section 152 gives the light reception signal acquired from the light receiving section 140 to the PC 600. On the other hand, the CPU 601 of the PC 600 executes the displacement measurement processing for the measurement object S on the basis of the displacement measuring program. The present invention is not limited to this.

For example, the PC 600 may not be provided. In this case, the main display section 700 and the operation section 800 may be connected to the arithmetic processing section 150 of the processing device 100. The displacement measuring program may be stored in the storing section 151 of the arithmetic processing section 150. Consequently, the control section 152 may execute the displacement measurement processing.

(16) In the embodiments, as shown in FIGS. 15 to 20, FIG. 31, and FIG. 35, the threshold or the threshold ratio with respect to the intensity of the light reception signal is displayed on the main display section 700 in the light reception confirmation processing. However, the threshold may not be displayed. The user may be able to switch display and non-display of the threshold with an input from the operation section 800.

(17) In the examples shown in FIGS. 15, 16, 20, 31, and 35, when a plot or a waveform fit in the screen is lower than the maximum peak value in the past and the maximum peak value in the past is present outside the screen according to the elapse of time involved in the adjustment, an indicator indicating the presence of the maximum peak value in the past may be shown in the intensity of a light reception signal equivalent to the maximum peak value in the past. The intensity of the light reception signal of the vertical axis may be normalized on the basis of the present peak value or the maximum peak value in the past up to the present point in time. For example, when the maximum peak value in the past is 80, the vertical axis may be configured such that 80 is located near an upper limit on the vertical axis of the light reception intensity. When the maximum peak value in the past increases to 350 according to the adjustment and the elapse of time, the vertical axis of the trend graph may be normalized such that 350 is located near the upper limit on the vertical axis of the light reception intensity.

[5] Correspondence Relation Between the Constituent Elements of Claims and the Sections in the Embodiments An example of correspondence between the constituent elements of claims and the sections in the embodiments is explained below. However, the present invention is not limited to the example explained below.

In the embodiments, the measurement object S is an example of the measurement object. The confocal displacement sensor 500 is an example of the confocal displacement sensor. The light projecting section 120 is an example of the light projecting section. The lens unit 220 is an example of the optical member. The distal end portion of the optical fiber 314 is an example of the pinhole. The optical fiber 314 is an example of the pinhole member.

The spectral section 130, the light receiving section 140, the arithmetic processing section 150, and the light guide section 300 are examples of the acquiring section. The main display section 700 is an example of the display section. The arithmetic processing section 150 and the CPU 601 are examples of the displacement measuring section. The CPU 601 is an example of the processing section. A condition that the peak value of the light reception signal is higher than the threshold for propriety determination is an example of the predetermined condition. The operation section 800 and the input field 462 shown in FIG. 12 are examples of the wavelength-range designating section. The unnecessary component removal correction is an example of the correction processing.

The processing device 100 is an example of the processing device. The measurement head 200, the first measurement head 200A, and the second measurement head 200B are examples of the head section. The housing 110 is an example of the first housing. The housing 210 is an example of the second housing. The first measurement head 200A is an example of one head. The second measurement head 200B is an example of the other head.

As the constituent elements of claims, other various elements having the configurations and the functions described in claims can also be used.

The present invention can be effectively used for various confocal displacement sensors.

What is claimed is:

1. A confocal displacement sensor comprising:
   a light projecting section configured to emit light having a plurality of wavelengths;
   an optical member configured to cause a chromatic aberration along an optical axis direction in the light emitted by the light projecting section, converge the light having the chromatic aberration, and irradiate the light on a measurement object;
   a pinhole member including a pinhole that is in a confocal optical system and allows, in the light irradiated on the measurement object by the optical member, light having a wavelength reflected while focusing on a surface of the measurement object to pass;
   an acquiring section including
      a spectral section configured to spectrally disperse the light passed through the pinhole, and
      a light receiving section configured to receive the light spectrally dispersed by the spectral section and acquire a light reception signal indicating intensity for each wavelength concerning the light;
   an arithmetic processing section configured to calculate, as a change information showing a change of the signal intensity acquired by the light receiving section against elapse of time, a change from the signal intensity at a past time to the signal intensity at a present time;
   a displacement measuring section configured to calculate displacement of the measurement object on the basis of signal intensity for each wavelength of the light passed through the pinhole; and
   a display section configured to display the change calculated by the arithmetic processing section against elapse of time.

2. The confocal displacement sensor according to claim 1, wherein the change information is a trend graph of the peak value of the light reception signals.

3. The confocal displacement sensor according to claim 2, wherein the change information further includes a waveform of the light reception signal.

4. The confocal displacement sensor according to claim 2, wherein the change information further includes a numerical value indicating the signal intensity at the present point in time.

5. The confocal displacement sensor according to claim 1, wherein the change information is a trend graph of the peak value of the light reception signals and a target value of the light reception signals.

6. The confocal displacement sensor according to claim 1, wherein the change information is a waveform of the light reception signal and a numerical value indicating the signal intensity at the present point in time.

7. The confocal displacement sensor according to claim 1, wherein the change information is a waveform of the light reception signal and a target value of the light reception signals.

8. A confocal displacement sensor that measures displacement of a measurement object placed in a measurement region using a confocal system comprising:
- a light projecting section configured to emit light having a plurality of wavelengths;
- an optical member configured to cause a chromatic aberration along an optical axis direction in the light emitted by the light projecting section, converge the light having the chromatic aberration, and irradiate the light on a measurement region;
- a pinhole member including a pinhole that is in a confocal optical system with the measurement region and allows, in a light with a chromatic aberration irradiated on the measurement region, light having a wavelength while being focused on the measurement region to pass;
- an acquiring section including
  - a spectral section configured to spectrally disperse the light passed through the pinhole, and
  - a light receiving section configured to receive the light spectrally dispersed by the spectral section and acquire a light reception signal indicating intensity for each wavelength concerning the light;
- an arithmetic processing section configured to calculate, as a change information showing a change of the signal intensity acquired by the light receiving section against elapse of time, a change from the signal intensity at a past time to the signal intensity at a present time;
- a displacement measuring section configured to calculate displacement of the measurement object on the basis of the signal intensity for each wavelength of the light passed through the pinhole; and
- a display section configured to display the change calculated by the arithmetic processing section against elapse of time.

9. The confocal displacement sensor according to claim 8, wherein the change information is a trend graph of the peak value of the light reception signals.

10. The confocal displacement sensor according to claim 9, wherein the change information further includes a waveform of the light reception signal.

11. The confocal displacement sensor according to claim 9, wherein the change information further includes a numerical value indicating the signal intensity at the present point in time.

12. The confocal displacement sensor according to claim 8, wherein the change information is a trend graph of the peak value of the light reception signals and a target value of the light reception signals.

13. The confocal displacement sensor according to claim 8, wherein the change information is a waveform of the light reception signal and a numerical value indicating the signal intensity at the present point in time.

14. The confocal displacement sensor according to claim 8, wherein the change information is a waveform of the light reception signal and a target value of the light reception signals.

15. A confocal displacement sensor including two measurement heads that measure displacement of a measurement object placed in a measurement region, comprising:
- a light projecting section configured to emit light having a plurality of wavelengths;
- a first measurement head, which is one of the two measurement heads, including;
  - a first pinhole member including a pinhole that is in a confocal optical system with the measurement region and allows, in a light with a chromatic aberration irradiated on the measurement region, light having a wavelength while being focused on the measurement region to pass;
  - a first optical member configured to cause a chromatic aberration along an optical axis direction in a light having a plurality of wavelengths, converge the light having the chromatic aberration, and irradiate the light on a measurement region; and
- a second measurement head, which is the other one of the two measurement heads and is provided being opposed to the first measurement head across a measurement region, including;
  - a second optical member configured to cause a chromatic aberration along an optical axis direction in a light having a plurality of wavelengths, converge the light having the chromatic aberration, and irradiate the light on a measurement region; and
  - a second pinhole member including a pinhole that is in a confocal optical system with the measurement region and allows, in a light with a chromatic aberration irradiated on the measurement region, light having a wavelength while being focused on the measurement region to pass; and,
- an acquiring section including
  - a spectral section configured to spectrally disperse the light passed through the first pinhole and/or the second pinhole, and
  - a light receiving section configured to receive the light spectrally dispersed by the spectral section and acquire a light reception signal indicating intensity for each wavelength concerning the light;
- an arithmetic processing section configured to calculate, as a change information showing a change of the signal intensity acquired by the light receiving section against elapse of time, a change from the signal intensity at a past time to the signal intensity at a present time;
- a displacement measuring section configured to calculate a displacement of the measurement object on the basis of the signal intensity for each wavelength of the light passed through the first pinhole and/or the second pinhole; and
- a display section configured to display the change calculated by the arithmetic processing section against elapse of time.

16. The confocal displacement sensor according to claim 15, wherein the change information is a trend graph of the peak value of the light reception signals.

17. The confocal displacement sensor according to claim 16, wherein the change information further includes a waveform of the light reception signal.

18. The confocal displacement sensor according to claim 16, wherein the change information further includes a numerical value indicating the signal intensity at the present point in time.

19. The confocal displacement sensor according to claim 15, wherein the change information is a trend graph of the peak value of the light reception signals and a target value of the light reception signals.

20. The confocal displacement sensor according to claim 15, wherein the change information is a waveform of the light reception signal and a target value of the light reception signals.

* * * * *